US008684805B2

(12) United States Patent
Takahashi

(10) Patent No.: US 8,684,805 B2
(45) Date of Patent: Apr. 1, 2014

(54) GAME APPARATUS, GAME CONTROL METHOD AND GAME CONTROL PROGRAM

(75) Inventor: Naoki Takahashi, Kobe (JP)

(73) Assignee: Konami Digital Entertainment Co., Ltd., Tokyo (JP)

( * ) Notice: Subject to any disclaimer, the term of this patent is extended or adjusted under 35 U.S.C. 154(b) by 1403 days.

(21) Appl. No.: 12/221,087

(22) Filed: Jul. 31, 2008

(65) Prior Publication Data

US 2009/0280879 A1 Nov. 12, 2009

(30) Foreign Application Priority Data

Aug. 3, 2007 (JP) .................................. 2007-203454
Aug. 3, 2007 (JP) .................................. 2007-203455

(51) Int. Cl.
*A63F 13/00* (2006.01)

(52) U.S. Cl.
USPC ............................................................. 463/3

(58) Field of Classification Search
CPC .............................................. A63F 2300/8011
USPC ............................................................. 463/3
See application file for complete search history.

(56) References Cited

U.S. PATENT DOCUMENTS 6,270,413 B1 * 8/2001 Aikawa et al. ................... 463/31
6,394,894 B1 * 5/2002 Okitsu et al. ...................... 463/3
6,394,895 B1   5/2002 Mino
8,070,607 B2 * 12/2011 Takahashi et al. .............. 463/42
2001/0044333 A1  11/2001 Okishio et al.
2004/0235565 A1 * 11/2004 Shiozawa ........................ 463/32

FOREIGN PATENT DOCUMENTS

| EP | 1 900 402 | 3/2008 |
| JP | 2001-137556 | 5/2001 |
| JP | 2001-293251 | 10/2001 |
| JP | 2003-071136 | 3/2003 |
| JP | 2004-275227 | 10/2004 |
| JP | 2006-068197 | 3/2006 |
| JP | 2006-246968 | 9/2006 |
| JP | 2006-325885 | 12/2006 |

OTHER PUBLICATIONS

Arcadia published on Apr. 30, 2000 by ASCII Media Works Inc., vol. 3, pp. 220.

* cited by examiner

*Primary Examiner* — Melba Bumgarner
*Assistant Examiner* — Thomas H Henry
(74) *Attorney, Agent, or Firm* — Jordan and Hamburg LLP

(57) ABSTRACT

In a game apparatus, a game control method and a game control program, if a baseball game proceeds without all the pitches in one at-bat being made, a virtual pitch sequence history is presented, and the sizes of a pitching mark and a batting mark of pitcher and batter sides are changed in relation to this pitch sequence history upon designating a pitching position and a batting position. Since the sizes of the pitching mark and the batting mark are changed based on the pitch sequence history in this way, a more interesting game with more importance attached to the strategic characteristic thereof can be provided.

25 Claims, 22 Drawing Sheets

US 8,684,805 B2

GAME APPARATUS, GAME CONTROL METHOD AND GAME CONTROL PROGRAM

BACKGROUND OF THE INVENTION

1. Field of the Invention

The present invention relates to a baseball game apparatus which is communicably connected with another game apparatus operable by an opponent game player and in which a pitching position designation area and a batting position designation area of the same shapes and a pitcher character and a batter character simulating a pitcher and a batter battling with each other are displayed at specified positions of a screen of a display device by an image display control means, the both characters are caused to battle by a pitching motion by the pitcher character and a batting motion by the batter character at the respective positions designated by a game player and the opponent game player and the progress of a game simulating a baseball game is controlled in accordance with the battle result.

2. Description of the Background Art

Japanese Unexamined Patent Publication No. 2006-325885 (D1) discloses a game system in which a game apparatus including a touch panel and a monitor is connected with another game apparatus via a network. The game apparatus employed in this game system includes a first image display controlling section for displaying a pitcher character, a batter character and a strike zone image on the monitor, a setting section for setting a pitching position (or swing position) in the strike zone image based on operation information inputted via the touch panel and setting a round first mark image based on the set position, a second image display controlling section for displaying the first mark image on the strike zone image in a superimposed manner and displaying a round second mark image indicating the swing position (or pitching position) received from the other game apparatus after a setting processing by the setting section, and a batting result setting section for setting a batting result according to an overlapping degree of the first and second mark images. The sizes (diameters) of the first and second mark images are variably set according to the player ability data of the pitcher character, batter character and the like. This game system provides more varied games while peculiarizing the designation of offense positions and defense positions and a battle result judgment processing by making the sizes of the first and second mark images variable according to the player ability data.

Since the sizes of the first and second mark images for determining the batting result according to the overlapping degree of the first and second mark images are changed according to the player ability data in D1, the game system disclosed in D1 can be evaluated to provide games with a certain variety. However, the sizes of the first and second mark images of player characters appearing in the game can be predicted to a certain degree particularly since skilled game players may grasp or memorize the abilities of the respective player characters to a certain degree. Accordingly, there has been a certain limit in the variety of the game in the game system disclosed in D1. Further, in a baseball-simulating game, pitch sequence is one factor deciding a battle, but it is not easy to directly reflect the pitch sequence as a game strategy in a mode for proceeding with the game with a battle in each at-bat done by one pitch.

SUMMARY OF THE INVENTION

In view of the above situation, an object of the present invention is to provide a game apparatus, a game control method and a game control program which attach more importance to the strategic characteristic of a game and provide more variously interesting games.

In a game apparatus, a game control method and a game control program according to the present invention, if a baseball game proceeds without all the pitches in one at-bat being made, a virtual pitch sequence history is presented, and the sizes of a pitching mark and a batting mark of pitcher and batter sides are changed in relation to this pitch sequence history upon designating a pitching position and a batting position. Since the sizes of the pitching mark and the batting mark are changed based on the pitch sequence history in this way, a more interesting game with more importance attached to the strategic characteristic thereof can be provided.

These and other objects, features, aspects and advantages of the present invention will become more apparent upon a reading of the following detailed description with reference to accompanying drawings.

BRIEF DESCRIPTION OF THE DRAWINGS

FIG. 2 is an exemplary perspective view showing the construction of a card placing portion, FIG. 3 are diagrams showing a relationship between the configuration of a player card and a placing surface, wherein

DESCRIPTION OF THE PREFERRED EMBODIMENTS

Figure 1:
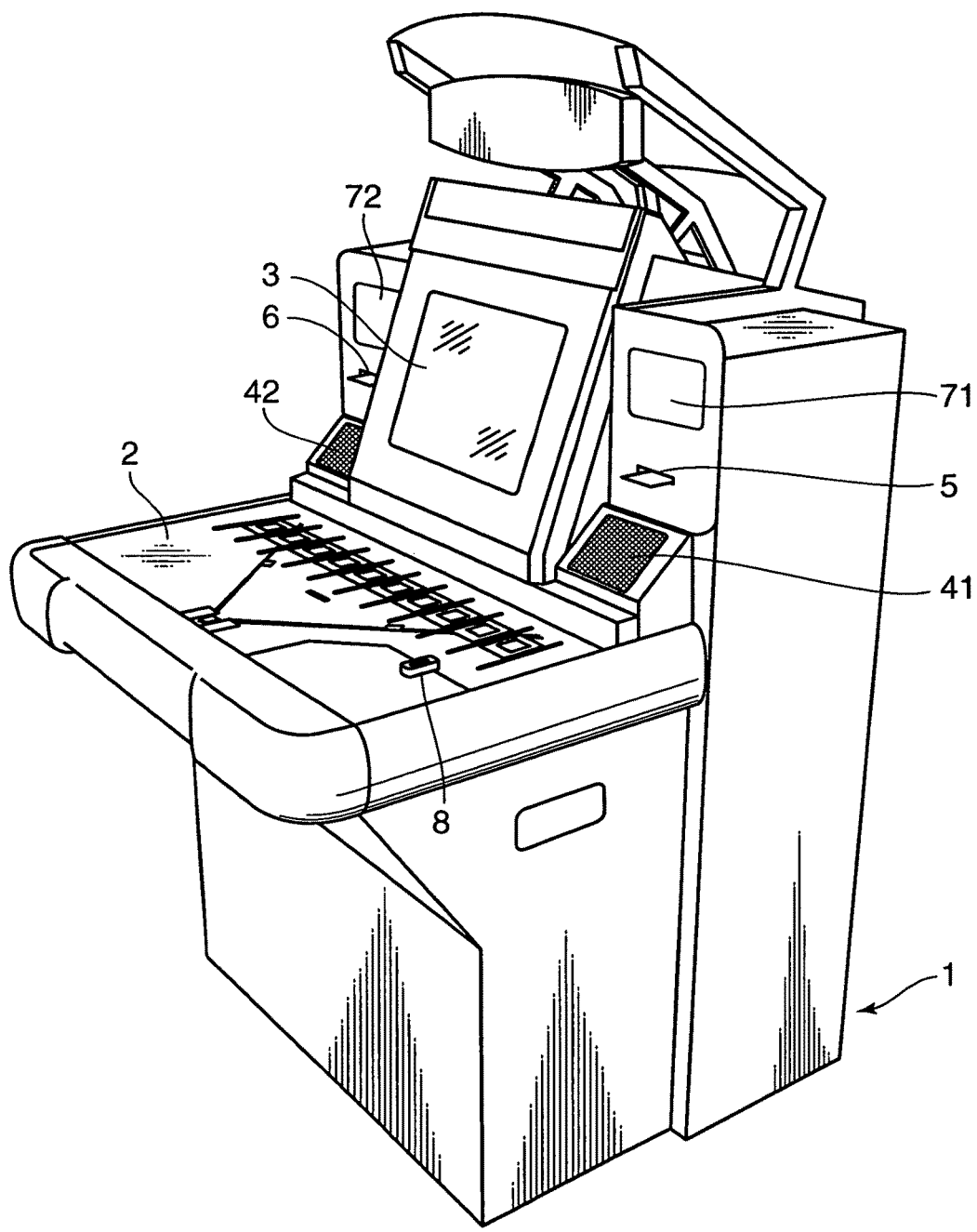
FIG. 1 is an external construction diagram showing one embodiment of a game apparatus according to the invention.

Hereinafter, one embodiment of the present invention is described with reference to the accompanying drawings. Constructions identified by the same reference numerals are identical in the respective figures and not repeatedly described.

FIG. 1 is an external construction diagram showing one embodiment of a game apparatus according to the present invention. This game apparatus includes a specified three-dimensional structure, e.g. a substantially rectangular parallelepipedic housing 1, wherein a card placing portion 2 having placing surfaces 20 (see FIG. 2) on which a game player places player cards of a specified shape is formed substantially in the center of the front surface, a monitor such as a CTR display device or a liquid crystal display device for displaying game images stands atop the card placing portion 2, and loudspeakers 41, 42 for outputting sounds and sound effects are arranged at the left and right sides of the monitor 3. An insertion slot 5 for individual cards is formed above one of the left and right loudspeakers 41, 42, here the right loudspeaker 41, and an issuance slot 6 for player cards to be described later is formed above the left loudspeaker 42. Light emitters 71, 72 for producing illumination effects are arranged above the individual card insertion slot 5 and the player card issuance slot 6. A coin insertion slot 8 for guiding the insertion of coins is formed at a specified position of the placing portion 2. In this embodiment, coin insertion is a game starting condition.

Figure 2:
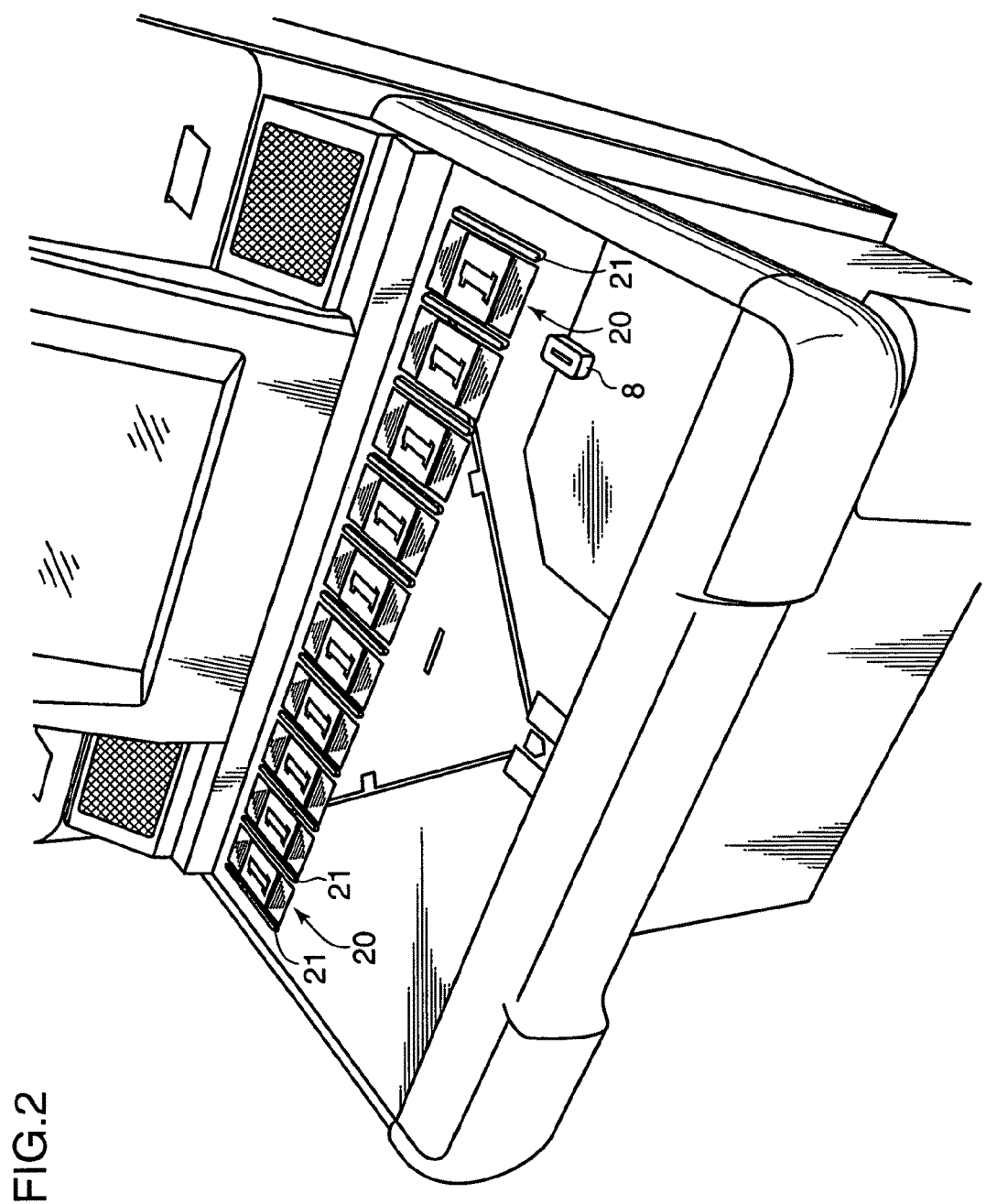

FIG. 2 is an exemplary perspective view showing the construction of the card placing portion 2. The upper surface of the card placing portion 2 has a specified shape, here a rectangular shape, and is horizontal and planar. In this embodiment, this game apparatus supposes a baseball game and, accordingly, a picture simulating a field of a baseball stadium is drawn on the card placing portion 2. Player cards 9 having a specified shape as shown in FIG. 3 can be employed. In this embodiment, rectangular player cards are employed. Placing surfaces 20, on which cards are placed, are prepared at specified intervals in a transverse direction such that a plurality of, i.e. ten cards in this embodiment, can be placed. Each placing surface 20 is formed in conformity with the width of the player card 9 and guide members as assisting members for easily guiding a sliding movement of the player card 9 in one direction, e.g. forward and backward directions from a placing position are formed at the left and right sides of the placing surface 20. For example, the guide members are a pair of ribs 21 extending in a sliding direction (here, forward and backward directions) while being spaced apart by the width of the player card 9. A dimension of the ribs 21 in forward and backward directions is set in conformity with a slide width of the player card 9.

Figure 3B:
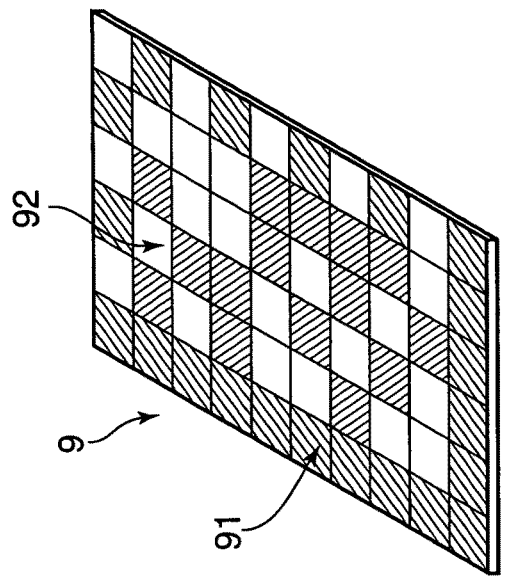
FIG. 3A is a perspective view showing the relationship between the configuration of the player card and the placing surface and FIG. 3B is a diagram showing contents written on the underside of the player card.
Figure 3A:
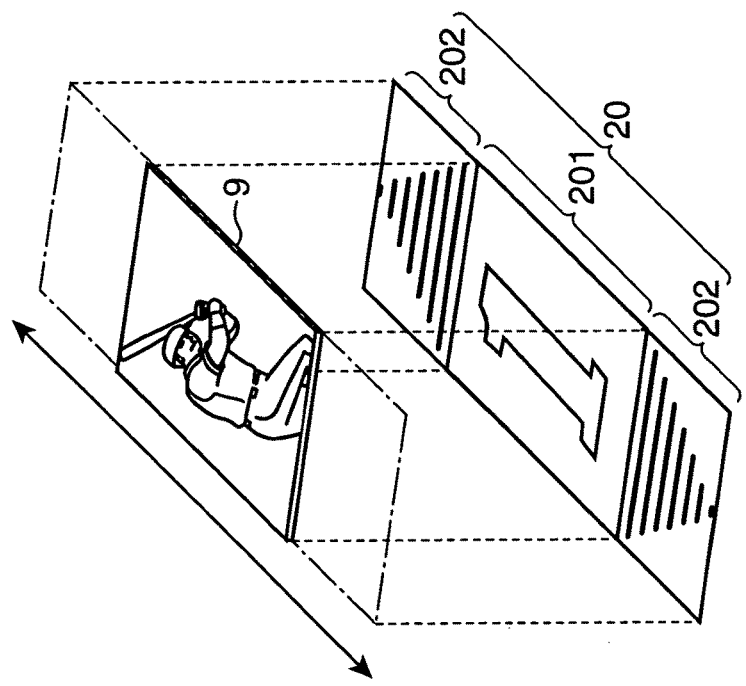

FIG. 3 are diagrams showing a relationship between the configuration of the player card and the placing surface, wherein FIG. 3A is a perspective view showing the relationship between the configuration of the player card and the placing surface and FIG. 3B is a diagram showing contents written on the underside of the player card. In FIG. 3A, the player card 9 is shown elevated from the placing surface 20 for the sake of description. As shown in FIG. 3A, the placing surface 20 is comprised of a central part 201 and slide parts 202 at the front and rear sides. The central part 201 has the same size as the player card 9 and the slide parts 202 have a specified dimension in forward and backward directions from the central part 201. The slide parts 202 may, for example, have a dimension, which is about half the length of the player card in a longitudinal direction. The slide parts 202 are for changing a later-described action mode of a character corresponding to the player card 9 and displayed on the monitor 3 by placing the player card 9 displaced (slid) relative to the central part 201 in a range shown by arrows. The player card 9 has a player character image printed on the top surface thereof and has visible player information such as the face picture image, name and the like of the player and visible player identification data printed on the underside thereof.

As shown in FIG. 3B, marks printed on the underside of the player card 9 include a position detection mark 91 used to detect the placed position of the player card 9 on the placing surface 20 and a character mark 92 indicating character data as the identification data of the player character corresponding to the player card 9. The character data are called player parameters below and differently used as fielder parameters, pitcher parameters and batter parameters according to the contents. Identification numbers can be used as the player identification data. Here, for the sake of description, the player card 9 is divided into 6×10 areas, wherein the periphery of the player card 9 is used as the position detection mark 91 and 4×6 areas inside are used as the character mark 92. Actually, the player card 9 is divided into areas using matrix numbers capable of storing necessary data.

The position detection mark 91 is formed by applying a specified material to all the areas on two adjacent sides of the four sides and to every other areas in row and column directions on the remaining two sides. By providing continuous parts and alternate parts in this way, erroneous placement inverted in forward and backward directions can be detected to enable reliable position detection in a correct orientation.

The character mark 92 forms the player identification data by applying a specified material to the areas one area inside of the outer periphery and using each of these areas as 1 bit. In all the game apparatuses, the player character data (player parameters) of all the players are stored in correspondence with the player identification data in a specified memory beforehand and, at the time of a game, the player parameters of the player identification data specified by the reading of the player cards 9 are read from the memory to be used.

The material to be applied may be a visible material, but an invisible material reacting to infrared light is, for example, used since means for detecting infrared light to be described later is used in this embodiment. As an example, the player card 9 is made of a material which absorbs infrared light or has the underside thereof coated with such an absorbing material, and the marks are written on the underside. At least the placing surfaces 20 of the card placing portion 2 are made of a material which transmits infrared light.

The character mark 92 indicates the identification information specifying the character and its abilities (including skills). In the case of a batter, abilities include fielder parameters such as "trajectory", "meet", "power", "running ability", "shoulder force", "defensive skill", "error avoidance value", "main position" as common items and fielder parameters such as "intimidating power", "meet correction for southpaw", "power correction for southpaw", "chance correction", "swing timing", "average hitter", "power hitter", "chance maker", "game-ending man", "adverse circumstances", "hitting to opposite field", "spray hitting", "inside single", "bunt", "bases-loading man", "pinch hitter", "strike-out man", "first pitch hitter", "multiple hits", "repeated hits", "$4^{th}$ batter", "two homeruns", "tenacious man", "defense specialist", "base steal", "body check", "base running", "home sliding", "throwing", "block", "mood maker", "RBI error", "$1^{st}$ inning first batter homerun man", "catcher lead level", "laser beam (throw-in quickness)", "tackle (indicating dynamism, vigor)" as special ability items corresponding to the individual characters.

In the case of a pitcher, abilities include pitcher parameters such as "ball speed", "slider change", "curve change", "fork change", "sinker change", "screw change" (these are called breaking ball changes), "control", "straight ball speed", "pitching build", "starting pitch adjustment", "fatigue recovery" and "ball location" as common items and pitcher parameters such as "intimidating power", "correction for left batter", "pinch", "toughness", "runner", "start", "rising performance", "brink", "release", "ball acceleration", "game luck", "pickoff", "reaction to hit ball", "short temper", "base on balls", "dangerous mistake pitch rate", "quickness", "close game", "responsibility", "power allocation", "ball speed stability" and "poker face" as special ability items corresponding to the individual characters. These fielder parameters and pitcher parameters are set for all the player characters here. With these respective player parameters, the abilities or tendencies (plus direction, minus direction) are specified in necessary levels, e.g. in two levels ("1" in the case of presence, "0" in the case of absence) or in three levels (−1, 0, 1) or in more levels. Further, the parameter "ball location" is stored as "equal to or better than average" or "below average" in this embodiment.

Figure 4:
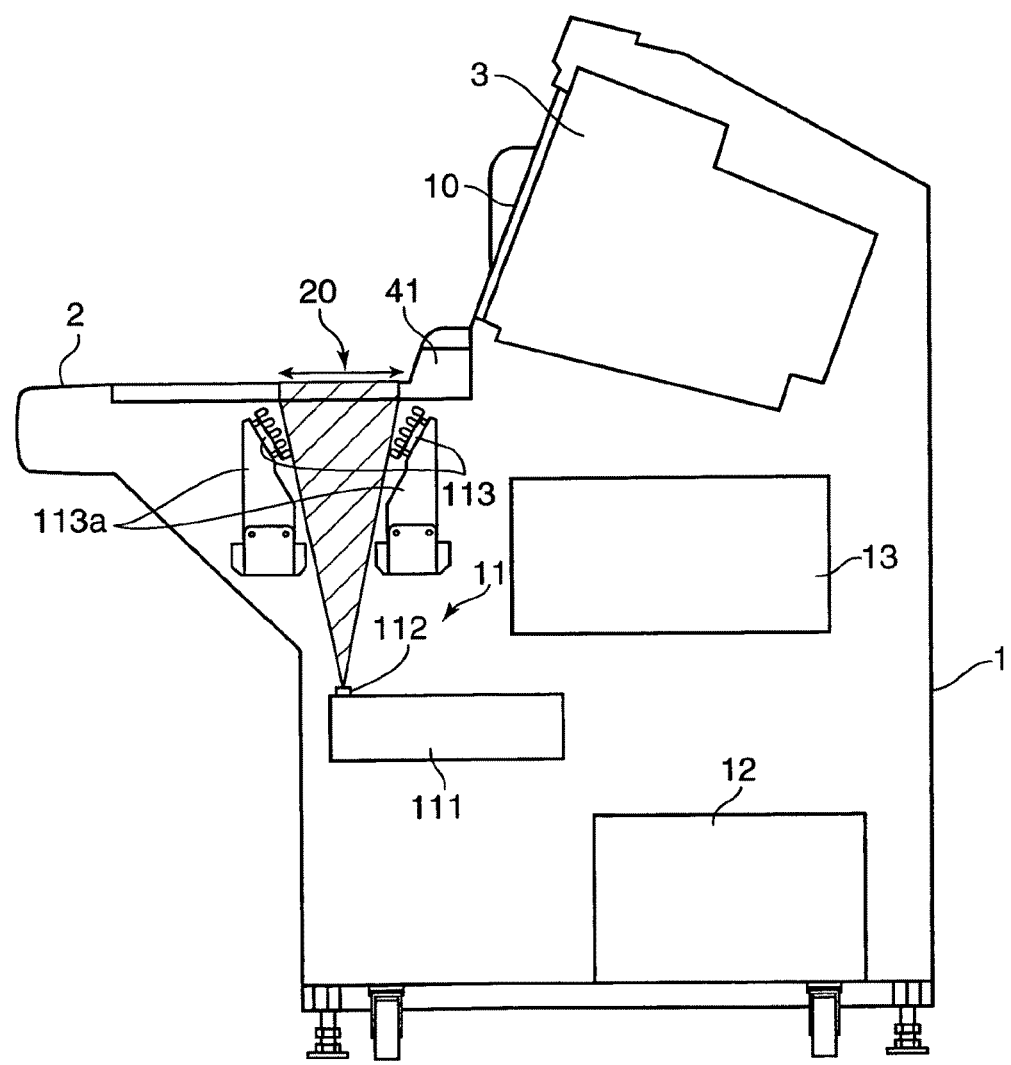
FIG. 4 is a side view in section of the game apparatus.
Figure 5:
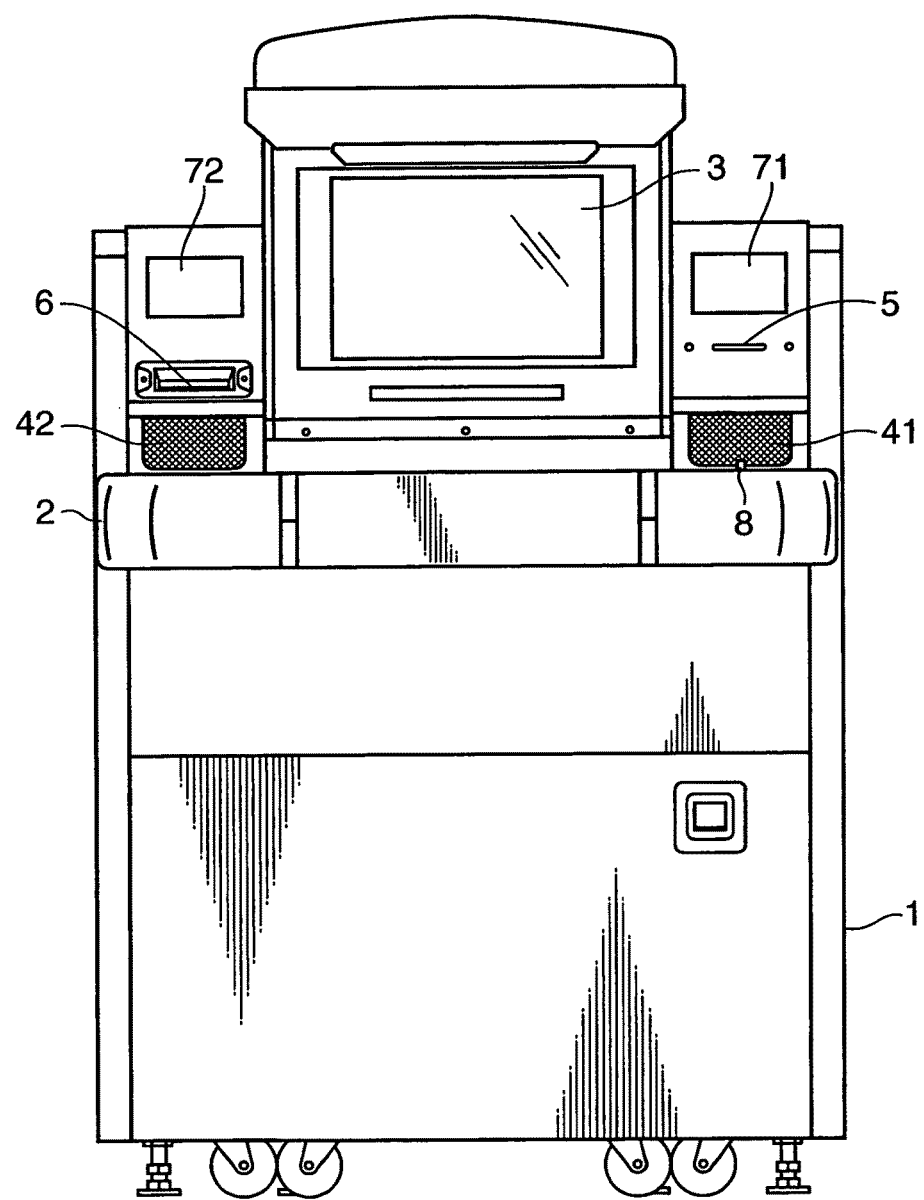
FIG. 5 is a front view of the game apparatus.

FIG. 4 is a side view in section of the game apparatus and FIG. 5 is a front view thereof. In FIG. 4, a touch panel 10 as a pressure-sensitive device in the form of a transparent thin layer is placed on the tube surface of the monitor 3. This touch panel 10 is for outputting a position pressed by a finger or the like in the form of a voltage level indicating a position in vertical and horizontal directions. Specifically, the touch panel 10 is a rectangular thin layer, formed, for example, by covering an array of pressure-sensitive elements made of linear transparent members at specified intervals in horizontal and vertical directions with a transparent cover and adhered onto the tube surface of the monitor 3. A known touch panel can be employed as the touch panel 10, which can detect which button has been operated from the addresses of buttons for urging the selection of items displayed on the screen of the monitor 3 and the pressed position. This touch panel 10 also detects a pressed position when an arbitrary position in an area image virtually showing a strike zone to be described later is pressed. In other words, the pressed position in the area image is specified by replacing the coordinates of the pressed position detected by the touch panel 10 by coordinates on the display screen and comparing the coordinates after replacement and display coordinates of the area image.

An image pickup unit 11 is arranged below the placing surfaces 20 in the housing 1. The image pickup unit 11 functions to detect the positions of the player cards 9 placed on the placing surfaces 20 and to read information on the undersides of the player cards 9. The image pickup unit 11 includes a container housing for a picked image processor 111 for controlling an image pickup operation and processing the picked-up image, image sensors 112 as image pickup devices (digital image pickup devices such as CCD cameras) mounted on the top of the container housing, and light sources 113 for generating infrared lights. The image sensors 112 have their angles of view set such that all the placing surfaces 20 are included in a field of view to sense the marks 91, 92 on the undersides of the player cards 9 placed on the placing surfaces 20. Although not shown, a specified plurality of, e.g. two image sensors 112 are arranged side by side in the transverse direction (depth direction of the plane of FIG. 4), wherein one image sensor 112 is set to have a field of view including the five player cards 20 in the right half and the other image sensor 112 is set to have a field of view including five placing surfaces 20 in the left half.

The light sources 113 are arranged below the card placing portion 2 obliquely to forward and backward directions while being supported by light source supporting members 113a, and emit lights of a specified wavelength, here infrared ray lights (including far infrared ray lights) toward the placing surfaces 20 from these oblique lower positions to irradiate the placing surfaces 20, i.e. the undersides of the player cards 9 arranged on the placing surfaces 20 with the infrared lights. The light sources 113 are arranged at specified intervals or substantially consecutively in the transverse direction to uniformly irradiate all the placing surfaces 20. For more uniform irradiation, the light sources 113 are arranged at the front and rear sides of the placing surfaces 20 and mounted outside the angle of view of the image sensors 112 so as not to hinder the image pickup operation. Each image sensor 112 is such that a multitude of photoelectric conversion elements are arrayed, for example, in a matrix, and cyclically receives light images of infrared lights, which are emitted from the light sources 113 and reflected by the undersides of the player cards 9 on the placing surfaces 20 and represent the marks 91, 92, using the photoelectric conversion elements, i.e. convert the light images into electrical signals with levels corresponding to the received light amounts. Unillustrated filters for preferably transmitting only the infrared lights are arranged on the front surfaces of the unillustrated photoelectric conversion elements. The picked image processor 111 transfers (imports) the cyclically picked images to an unillustrated internal memory and calculates the card placed positions of the player cards 9 on the placing surfaces 20 by extracting the position detection marks 91 as addresses of the memory from the picked images developed in the memory and specifying the shapes of the position detection marks 91 using, for example, pattern recognition technology. The picked image processor 111 reads the player identification data of the character mark 92, for example, as bit information of the respective areas in the row and column directions using information on the detection pixel addresses of the position detection mark 91 in the picked image.

A power supply unit 12 for supplying powers of specified levels to the respective parts of this game apparatus and a control board unit 13 having built-in control boards for centrally executing game processings are arranged in the housing 1.

Figure 6:
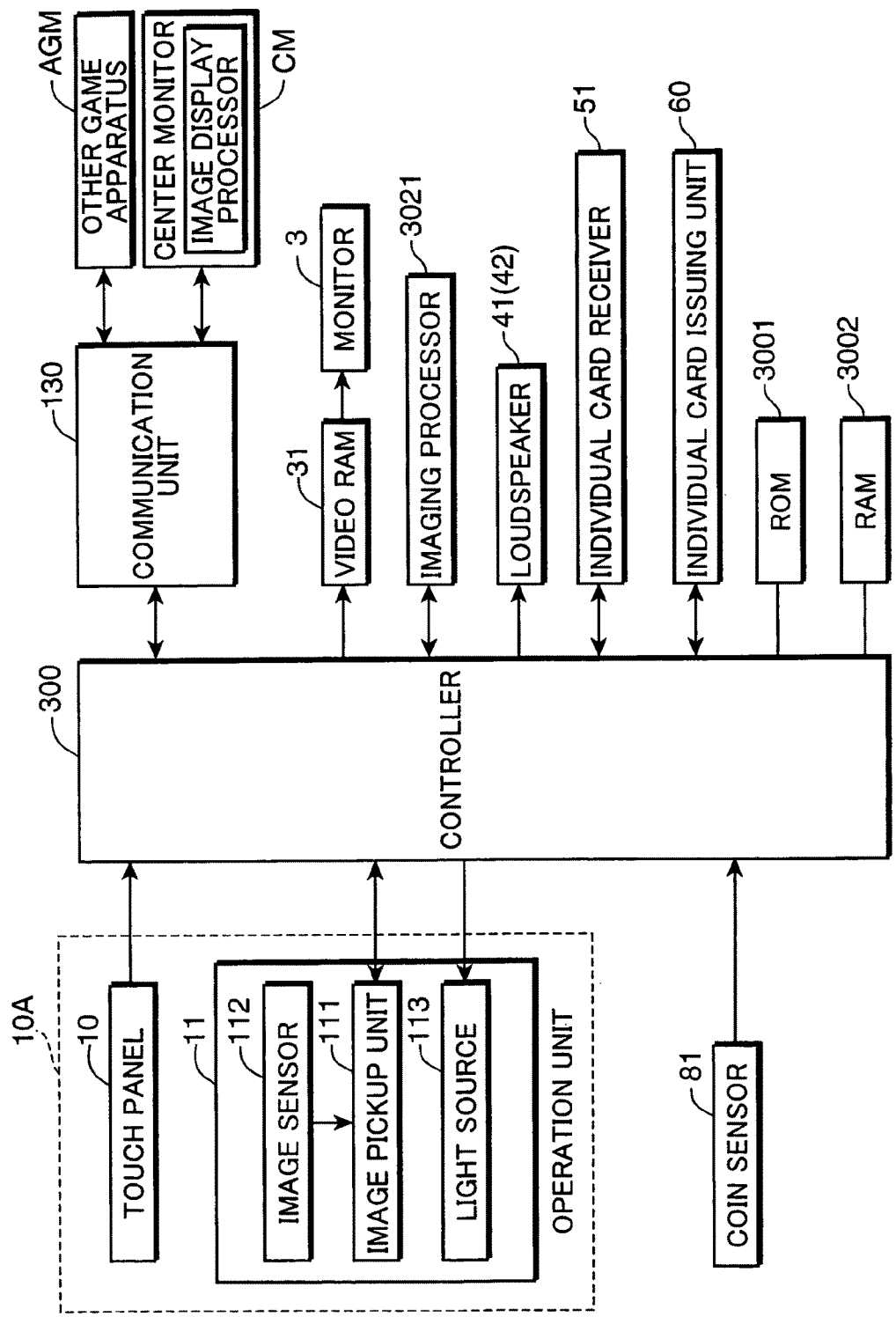
FIG. 6 is a block diagram showing the hardware of a controller and other devices built in a control board.

FIG. 6 is a block diagram showing the hardware of a controller and other devices built in the control board unit. In FIG. 6, interfaces between a controller 300 and the respective devices and parts for generating drive signals for driving the respective devices in response to control instructions are not shown for the sake of description because being common means.

A communication unit 130 transmits and receives data to and from another game apparatus AGM and transmits game status information and the like to an unillustrated center monitor CM if necessary. It is assumed that a plurality of game apparatuses are installed in a shop (game arcade), and the center monitor CM includes a computer internally provided with an image display processor for the center monitor and promotes to raise willingness to play by receiving operation signals of the respective game apparatuses to display the used statuses of the game apparatuses, receiving signals representing the statuses of games being played to selectively display the game statuses or to display game images showing a special status such as a big point spread or conversely the same point, a pinch or chance at the final inning in the shop. In a mode of installing the game apparatuses in a plurality of shops, competition can be made via the communication units 130 among different shops. The communication unit 130 is also communicably connected with an unillustrated center server via a network. When an individual card is inserted into the game apparatus, data necessary for the game processing out of data on the game history of the corresponding game player of the information of this individual card, e.g. specified history data in the past games to be described later are transferred to the game apparatus and to the competing opponent game apparatus(es) if necessary. At the time of ending the game, a history is updated by incorporating the result of the game this time and the updated data is managed.

The touch panel 10 and the image pickup unit 11 construct an operation unit 10A. Further, a coin sensor 81 for detecting whether inserted coins are genuine or false and measuring a necessary number of coins is arranged inside the coin insertion slot 8. The inserted coins are stored in an unillustrated safe (box) in the housing. An individual card receiver 51 is disposed in the individual card insertion slot 5, verifies whether or not the game player is a member via the center server and returns the card through the individual card insertion slot 5 after the completion of the game. In a mode without the center server, the game apparatus may be constructed to store member information and perform the above verification processing or the individual card may be constructed to store all the data such as the game history.

A player card issuing unit 60 is such that a multitude of player cards 9 are stacked up in an unillustrated card storing portion inside. Every time the game ends, a specified number of, here one player card 9 is conveyed from the card storing portion to the player card issuance slot 6 by a pickup portion to be given (presented) to the player. In this way, a structure in which the player collects player cards is built and willingness to play the game is aroused. The number of player cards to be issued may be changed depending on the game result.

A ROM 3001 stores a game program for executing this game, an imaging processing program for generating all the image data to be displayed on the monitor 3 and three-dimensional images in a game space, parameters necessary to determine the progress of the game or game result, various data to serves as judgment elements and pitch sequence history data to be described later. Particularly, since a baseball game is simulated in this embodiment, a control program for executing defense-side and offense-side processings in compliance with actual baseball rules is created and stored in the ROM 3001, and fielder parameters and pitcher parameters of all the players planned to be appear in this game are stored in correspondence with the player identification data in the ROM 3001.

A RAM 3002 includes a work area for temporarily saving data being processed, and is for saving various data read from the ROM 3001 and various parameters such as the abilities of the respective player cards 9 obtained by the image pickup unit 11 during the game. The data can be reflected on the game by being read according to needs.

A video RAM 31 has at least a memory capacity corresponding to display pixels of the monitor 3 and is used for forming a display image. An imaging processor 3021 is a hardware circuit unit for developing a display image in the video RAM 31 upon receiving an imaging command from the controller 300.

Figure 7:
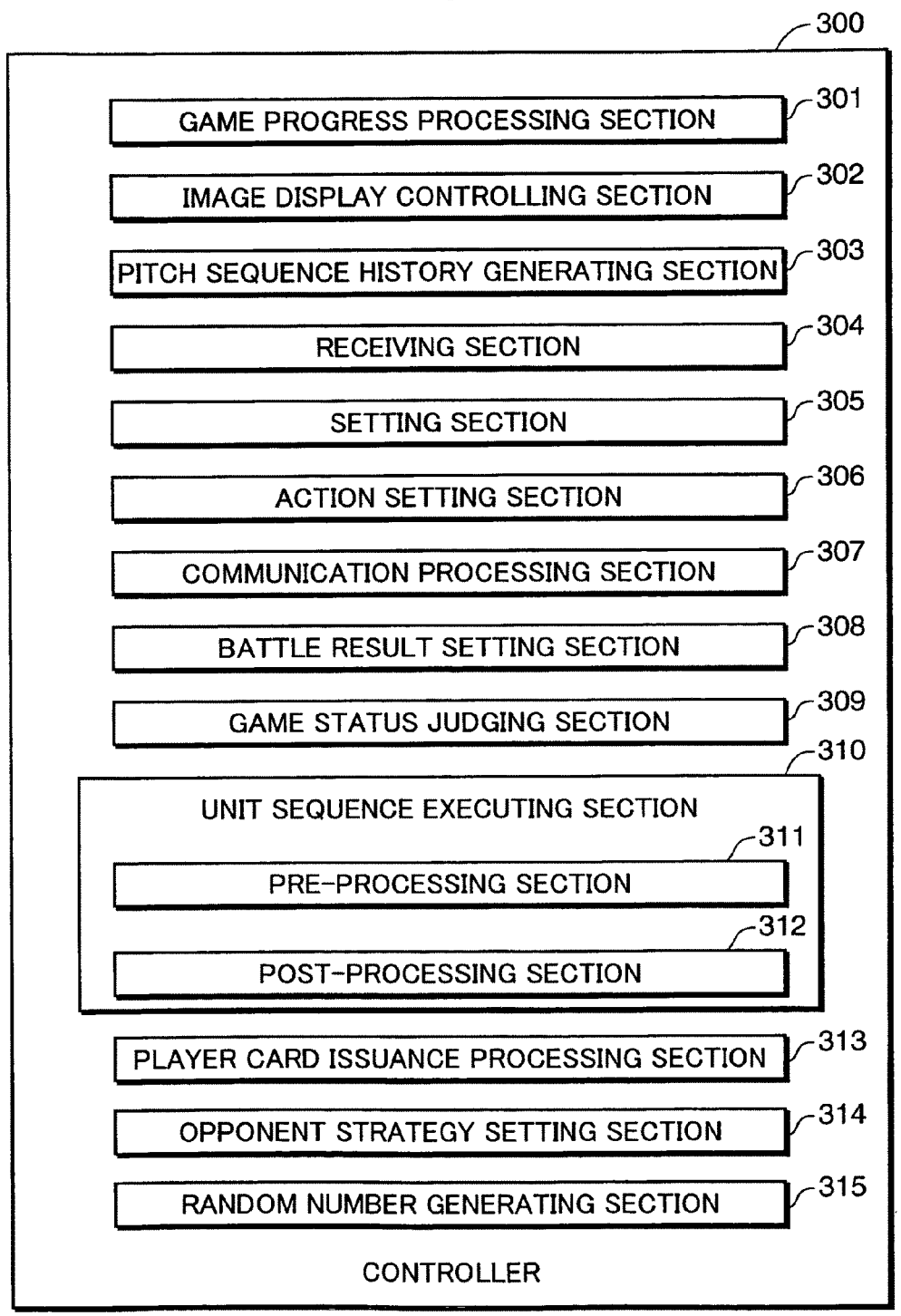
FIG. 7 is a block diagram showing functions of the controller.

FIG. 7 is a block diagram showing functions of the controller 300. The controller 300 includes a game progress processing section 301 for centrally controlling the progress of this game in accordance with the game program and an input operation made to the operation unit 10A, an image display controlling section 302 for controlling the display of a game image on the monitor 3, a pitch sequence history generating section 303 for generating a pitching position in a battle by the last pitch in each at-bat and a virtual pitch sequence history up to the last pitch in each at-bat prior to the designation of a switch (batting) position, a receiving section 304 for receiving various pieces of input operation information from the operation unit 10A used to select a display button and designate the pitching position and the batting position, a setting section 305 for setting the positions and sizes of mark images based on the designation of the pitching position and the batting position if a course designations button to be described later is selected, an acting setting section 306 for generating pitching data when the pitcher character throws a ball or batting data when a batter swings based on the content received by the receiving section 304, a communication processing section 307 for exchanging the pitching data or batting data with the other game apparatus AGM, causing the communication unit 130 to transmit and receive necessary data to and from the center monitor CM and exchanging data with the center server if necessary, a battle result setting section 308 for determining a battle result based on data received from the action setting section 306 and the other game apparatus AGM, a game status judging section 309 for managing game statuses and judging a game status influential to the game result, a unit sequence executing section 310 for controlling one sequence to be executed using the determination content in the battle result setting section 308, input operation content from the operation unit 10A and the pitcher parameters if the own character is a pitcher or the fielder parameters if the own character is a batter or without any input operation, and a player card issuance processing section 313 for causing the issuance of the player cards 9 and an opponent strategy setting section 314 for carrying out an opponent-side processing in order to compete with the internal computer, i.e. execute a so-called CPU competition using this game apparatus.

The image display controlling section 302 displays necessary images in accordance with the game progress, e.g. various images such as a baseball field, defense-side and offense-side player characters (at least the pitcher character and batter character), a ball character, a bat character, an area image virtually expressing a strike zone to be described later, later-described pitching mark image and batting mark image generated as a result of position designation to be described later on the monitor 3, and includes the video RAM 31, etc.

In this embodiment, a baseball game competing by final points, i.e. the game result is supposed by executing actions in one at-bat (hereinafter, "one sequence") to battle when an own character (pitcher character in the case of a defense-side sequence, batter character in the case of an offense-side sequence), to which an action instruction is given from a game player operating the game apparatus, and an opponent character (batter character or pitcher character of the side battling with the own character), to which an instruction is given from an opponent game player (other game apparatus or internal CPU player); battle as a pitcher and a batter and by executing this sequence a total of 27 times (continuously) for three outs and nine innings in accordance with the baseball rules. In this baseball game, the execution of one sequence, i.e. a battle with one batter is not a battle by the respective pitches from the first one thrown to the batter, but a battle by a specified number of last pitches out of a plurality of pitches, e.g. by last one or two pitches, so that the game can more efficiently proceed as compared to the case where the battle is done by all the pitches. In this embodiment, the game can proceed with a battle done by last one (or two) pitch. In accordance with the baseball rules, typical ball counts are 2 strikes 3 balls, but are not limited to this. One at-bat may be finished with other ball counts. For example, it may be finished before reaching 2 strikes 3 ball or upon reaching 1 strike. A battle is done by the next pitch (i.e. it remains unchanged in light of one-pitch match).

Each of the pitcher character, the batter character, the other player characters if necessary, a background image simulating the baseball field, and the like is comprised of a necessary number of polygons so as to enable the three-dimensional imaging. The imaging processor 3021 (FIG. 6) performs a calculation for the conversion from positions in a three-dimensional space to those in a simulated three-dimensional space, a light source calculation and other calculations in accordance with an imaging instruction from the image display controlling section 302, and writes image data to be imaged in the video RAM, for example, writes (adheres) texture data in (to) an area of the video RAM designated by polygons based on the calculation results.

Here, a relationship between the operation of the image display controlling section 302 and that of the imaging processor 3021 is described. The image display controlling section 302 reads image data, control program data and game program data from the ROM 3001 in accordance with an operating system (OS) stored in the ROM 3001. Some or all of the read image data, control program data, etc. are saved in the RAM 3002. Thereafter, the image display controlling section 302 performs an image display processing in accordance with an image processing part of the control program and various data (image data including polygons and textures of objects to be displayed and other character images, and sound data) saved in the RAM 3002 and the detection signals and the like from the detectors. In other words, the image display controlling section 302 appropriately generates a command as a task for imaging and sound output in accordance with the game progress. The imaging processor 3021 performs the calculation of a viewpoint, the calculation of character positions and the like in the three-dimensional space (of course, this similarly holds for a two-dimensional space) with respect to the viewpoint, the light source calculation, the generation and processing of sound data in accordance with the above command. Subsequently, the imaging processor 3021 writes image data to be imaged in the video RAM 31 based on the above calculation results. The image data written in the video RAM 31 (after being supplied to a D/A converter via an interface to be converted into an analog video signal) is supplied to the monitor 3 and displayed as an image on the tube surface of the monitor 3. Similarly, the sound data and sound effect data are outputted from the ROM 3001 via the RAM 3002 (after being supplied to the D/A converter via the interface to be converted into analog sound signals) and outputted as sounds from the loudspeakers 41, 42.

Imaging instructions include, for example, the one for imaging a three-dimensional image using polygons and the normal one for imaging a two-dimensional image. Here, polygons are polygonal two-dimensional images. In this embodiment, triangular or rectangular polygons are used. An imaging instruction for imaging a three-dimensional image using polygons is comprised of polygon vertex address data read from the ROM 3001, texture address data indicating stored positions of texture data to be adhered to the polygons, color palette address data indicating stored positions of color palette data indicative of the colors of the texture data and luminance data indicating the luminances of the textures. One character (or object) is made up of a multitude of polygons. The image display controlling section 302 stores the coordinate data of the respective polygons in the three-dimensional space in the RAM 3002. The following processing is performed in the case of moving a character or the like on the screen of the monitor 3.

The image display controlling section 302 successively calculates three-dimensional coordinate data of the respective polygons after movements and after rotations based on the three-dimensional coordinate data of the vertices of the respective polygons temporarily saved in the RAM 3002 and movement amount data and rotation amount data of the respective polygons. Out of the three-dimensional coordinate data of the respective polygons thus calculated, the coordinate data in horizontal and vertical directions are supplied as address data in a display area of the RAM 3002, i.e. the polygon vertex address data to the imaging processor 3021. The imaging processor 3021 writes texture data indicated by the texture address data allotted beforehand in a triangular or rectangular display area indicated by three or four polygon vertex address data. In this way, the character (or object) formed by adhering the texture data to a multitude of polygons is displayed on the display surface of the monitor 3.

The receiving section 304 receives press information by the game player from the operation unit 10A, i.e. from the touch panel 10, placed position information of the player cards by the operation of the game player from the image pickup unit 11 and information on the pitcher parameters and the fielder parameters indicating the abilities of the player characters in the ROM 3001 corresponding to the player identification data on the undersides of the player cards 9.

Figure 20:
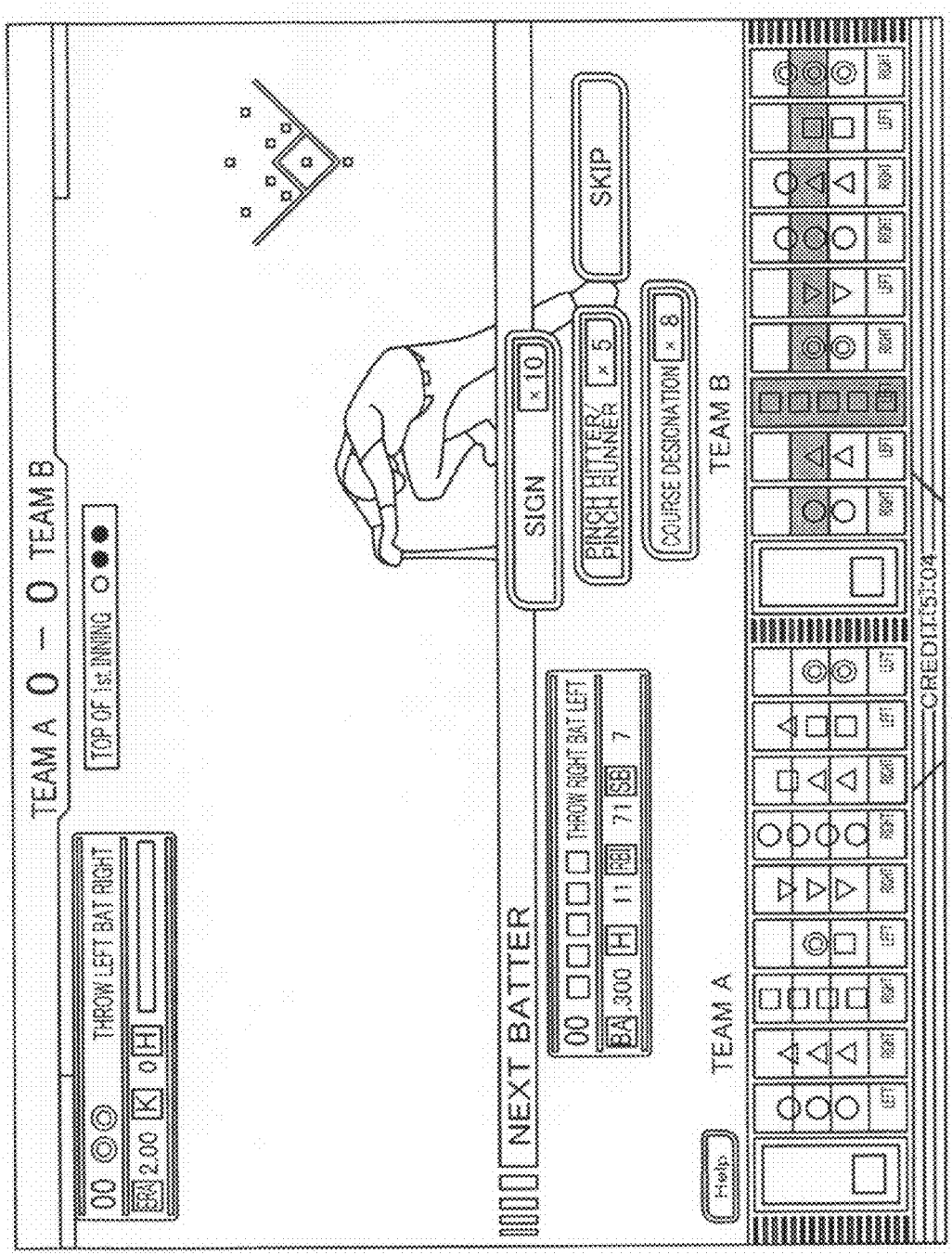
FIG. 20 is a diagram showing a game image at the start of a sequence when a game player is at a batter side.

A plurality of items at the time of a battle are selectably set in the ROM 3001. In this embodiment, items includes "sign", "pitch hitter/pinch runner", "course designation" and "skip" in the case of selecting none of the former items, and the image display controlling section 302 displays the respective items in the form of buttons as shown in FIG. 20 at the start of each sequence.

Concerning the item "sign", five particulars "alert for base steal", "alert for hit-and-run", "shift for bunt", "shift for double play shift" and "shift for extra-base hit" are prepared for the defense side and seven particulars "bunt", "sacrifice bunt", "hit-and-run", "base steal (double base steal)", "two steals", "three steals" and "squeeze" are prepared for the offense side. If the item "sign" is selected, the contents of these particulars are selectably displayed in the form of buttons on the screen. Other particulars may be adopted or added. The item "pinch hitter/pinch runner" is executed by placing a new player card 9 planned as a substitute on the placing surface 20 where the player card 9 to be substituted is placed. Upon replacing the player card 9, the player parameters corresponding to the player identification data newly read by the image pickup unit 11 are read from the ROM 3001 and used for the game.

The item "course designation" enables an instruction operation of the pitching position when the game player is at the pitcher side while enabling an instruction operation of the batting position when the game player is at the batter side.

In the game space, an area image (hereinafter, "strike zone image SZ" for the sake of convenience) of a specified shape, typically of a rectangular shape virtually indicating, for example, a strike zone above a home base is preferably made semitransparent and displayed by the image display controlling section 302. The position designating operation is performed by pressing the touch panel 10 placed on the monitor 3 at a desired position in this strike zone image SZ.

Figure 8:
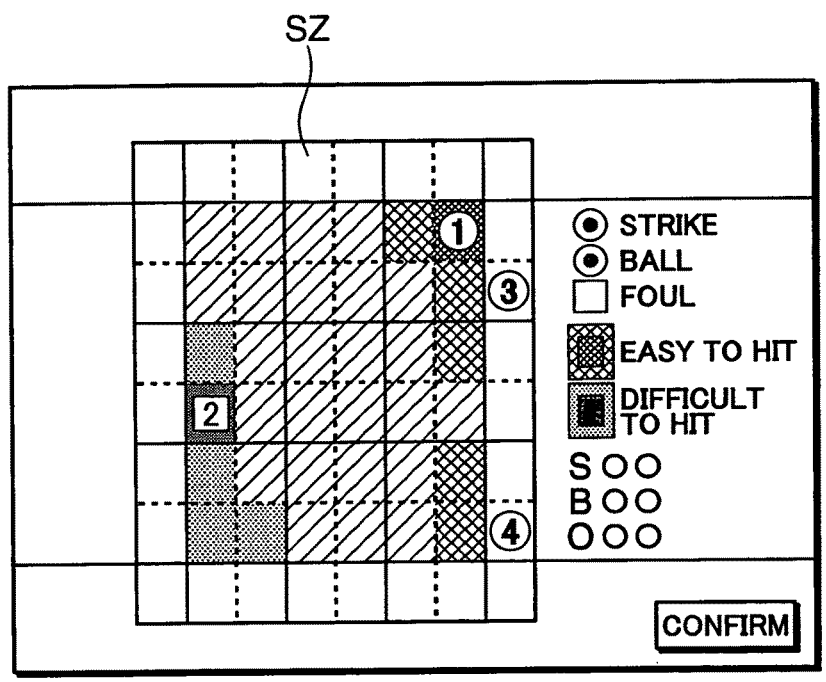
FIG. 8 is a diagram showing an exemplary screen for position designation, FIG. 9 are diagrams showing a strike zone SZ of a pitcher side for position designation as a part extracted from FIG. 8, FIG. 10 are diagrams showing a strike zone SZ of a batter side for position designation as a part extracted from FIG. 8.

If the "course designation" button in FIG. 20 is pressed, the image display controlling section 302 displays the strike zone image SZ for the designation of the pitching position or the batting position, for example, shown in FIG. 8 regardless of whether the own character is at the defense side (pitcher side) or at the offense side (batter side), and displays an image as shown in FIG. 9 (pitcher side) or FIG. 10 (batter side) for the confirmation of the designated position every time the position is designed.

The setting section 305 operates when the "course designation" button in FIG. 20 is pressed and determines the pressed position on the monitor 3 by the game player via the touch panel 10 with respect to the strike zone image SZ shown in FIG. 8. In other words, the position designation when the game player is at the defense side is the designation of a passing position of the ball character in the strike zone image SZ and the position designation when the game player is at the offense side is the designation of a passing position of the bat character simulating the bat swung by the batter character in the strike zone image SZ.

Figure 21:
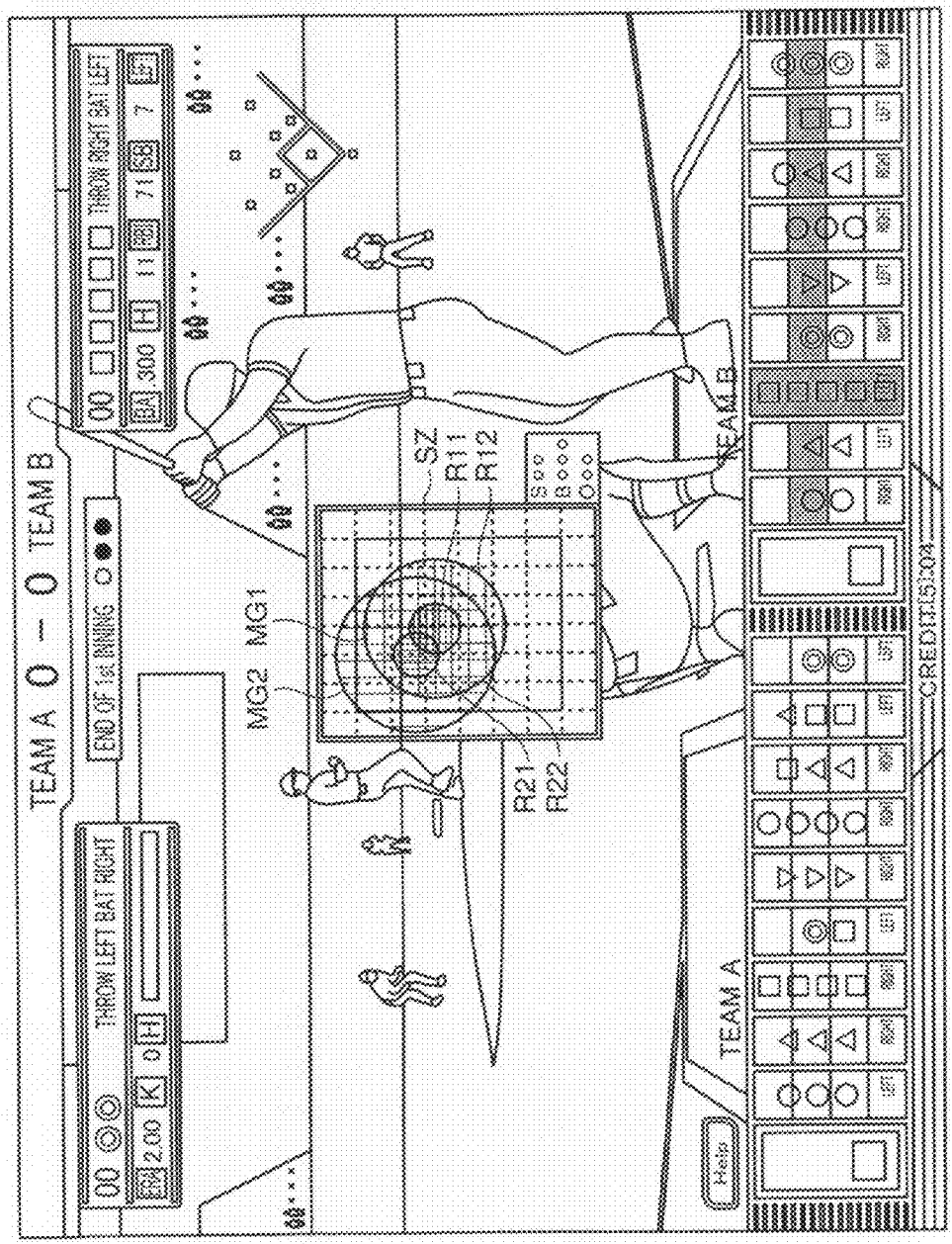
FIG. 21 is a diagram showing a game image in a state where a pitching position and a batting position overlap when the game player is at the batter side.
Figure 22:
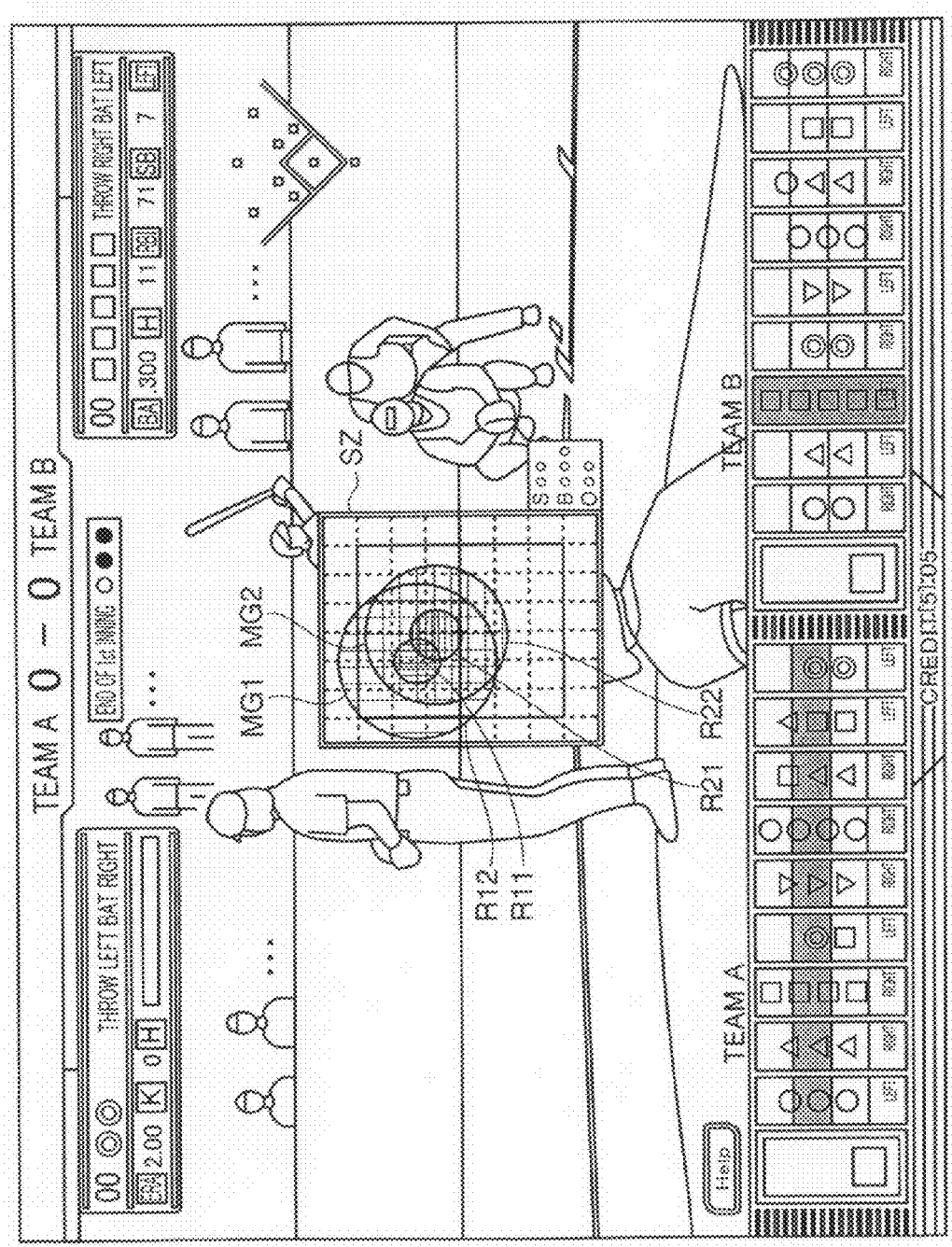
FIG. 22 is a diagram showing a game image in a state where the pitching position and the batting position overlap when the game player is at a pitcher side.

Further, the setting section 305 generates a graphic of a specified shape with reference to the position designated by the game player: a circular graphic having a specified radius and centered on the designated position in this embodiment, and the image display controlling section 302 displays this as a mark image MG1 (one of a pitching mark and a batting mark) on the monitor 3. In the other game apparatus operated by the opponent game player as an opponent, the position designation is similarly performed with respect to the strike zone image SZ (and the designated position is displayed on the monitor by the image display controlling section of the other game apparatus). Data on this designated position is received via the communication unit 130 as described later, and the setting section 305 similarly generates a circular graphic having a specified radius, and the image display controlling section 302 as a designation result display controlling section displays this as a mark image MG2 (other of the pitching mark and the batting mark) together with mark image MG1 as shown in FIGS. 21 and 22. The image display controlling section 302 enables such a game as to predict the position designated by the opponent (think ahead of an opponent's next move) by displaying the mark images MG1, MG2 together after the position designation of the mark image MG1 is completed (confirmed).

The circular graphics of the mark images MG1, MG2 may be single circles, but double circles are used as such in this embodiment. In other words, the double circle is comprised of a central circle portion R11 at an inner side and a ring portion R12 at an outer side, which are displayed in different modes, typically in different colors to be made easily distinguishable.

The setting section 305 sets the diameter of the central circle portion R11 and the width of the ring portion R12 of the mark image MG1 and the diameter of the central circle portion R21 and the width of the ring portion R22 of the mark image MG2 using the following parameters. The parameters for the pitcher include elements relating to pitching speed such as "ball speed", "intimidating power", "correction for left batter" and "ball acceleration" used for the central circle portion R11 and elements relating to ball location such as "control", "base on balls", "dangerous mistake pitch rate" and "quickness" used for the ring portion R12. The parameters for the batter include elements relating to power such as "power", "trajectory", "intimidating power", "power hitter", "game-ending", "adverse circumstances", "multiple hits", "tackle" and "$4^{th}$ batter" "repeated hits", "$4^{th}$ batter" used for the central circle portion R11 and elements relating to ball meet such as "meet", "meet correction for southpaw", "chance", "hitting to opposite field", "spray hitting", "inside single", "bunt", "bases loaded", "first pitch", "multiple hits" and "tenaciousness" used for the ring portion R12. Of course, elements (parameters) other than the above parameters may be used or added.

Accordingly, in the case of the pitcher character, the radius of the central circle portion R11 (R21) becomes smaller as the total of the parameter values of the elements relating to the pitching speed becomes higher and the width of the ring portion R12 (R22) becomes smaller as the total of the parameter values of the elements relating to the ball location becomes higher. Conversely, in the case of the batter character, the radius of the central circle portion R11 (R21) becomes larger as the total of the parameter values of the elements relating to the power becomes higher and the width of the ring portion R12 (R22) becomes larger as the total of the parameter values of the elements relating to the meet becomes higher. Thus, at the pitcher side, the higher the abilities, the smaller size (mark size) the mark image comes to have so as not to overlap the batting position of the batter (advantageous to the pitcher side). On the other hand, at the batter side, the higher the abilities, the larger size (mark size) the mark image comes to have so as to overlap the pitching position of the pitcher (advantageous to the batter side).

The respective parameters include those used independently of the game status and those relating to the game status (sequence), and the corresponding ones are used in the latter case. For example, if the game player is at the defense side and the game status (sequence) is such that the batter to battle with is a left-handed batter, the "for left-handed batter" parameter is used for the pitcher. At this time, if the "for left-handed batter" parameter is "1", a small radius is accordingly set for the central circle portion R11 of the mark image MG1. Further, if the game player is at the offense side and the game status (sequence) is such that the bases are full, the "bases loaded" parameter is used for the batter. At this time, if the "bases loaded" parameter is "1", a large width is accordingly set for the ring portion R12 of the mark image MG1. Conversely, if the parameter is "0", the width of the ring portion R12 is not changed by this parameter.

The diameter of the central circle portion R21 and the width of the ring portion R22 of the mark image MG2 are set by reading the player parameter corresponding to the identification data from the ROM 3001 upon starting the game since the identification data of the player card are received via the communication unit 130 if the opponent character is substituted.

The setting section 305 makes the game interesting by changing the sizes (magnification rates) of the mark images MG1, MG2 set based on the player parameters according to the strategy (prediction) between the game players. The strike zone image SZ is divided into a plurality of square sections, 6×6 square sections in vertical and horizontal directions, and a ball zone with a width of one square section is provided around the 6×6 square sections. The game player designates an arbitrary position in the 6×6 square sections inside. The ball zone in the strike zone image SZ assumes that some of pitch sequence histories to be described later include balls at pitching positions, whereby variation and realism can be added to the pitch sequence histories.

Since the mode for a battle by one pitch and one swing is adopted in this embodiment as described above, pitching positions (courses) up to this pitch in one at-bat are presented as a pitch sequence history including a pitch order to the game player in this example, thereby giving an opportunity to think ahead of the position designation for the deciding pitch to the both game players to improve a game element. The pitch sequence history is a virtual one and various patterns indicating a state of 2 strikes 2 balls or 3 balls are set for the sake of description. The setting section 305 generates the pitch sequence history for each sequence and displays it in the strike zone image SZ.

FIG. 8 is a diagram showing a screen example for position designation, wherein the strike zone image SZ is displayed substantially in the center of the screen and guidance information is displayed at another position. In the screen example of FIG. 8, the pitch sequence history is a state of 2 strikes 2 balls attained by the first pitch of strike at a right upper position, the second pitch of foul at a left slightly middle position, the third pitch of ball at a right slightly upper position and the fourth pitch of ball at a right lower position. The pitch sequence history may be generated arbitrarily or utilizing a specified rule every time, but pitch sequence histories virtually generated beforehand are stored in the ROM 3001 and the pitch sequence history generating section 303 generates the pitch sequence history indirectly, so to speak, by selecting one pitch sequence history for each sequence randomly or utilizing a probability in this embodiment. In this mode, specified types of patterns are prepared beforehand and stored while being classified into those advantageous, those neutral and those disadvantageous to the pitcher side. For example, 10 patterns are respectively generated as patterns advantageous, neutral and disadvantageous to the pitcher side, i.e. a total of 30 patterns are prepared. The contents of the patterns advantageous and disadvantageous to the pitcher side and a selection method for selecting a pattern are described later.

FIGS. 9 and 10 are diagrams showing an extracted part of the strike zone image SZ of FIG. 8 for position designation, wherein FIG. 9 show the pitcher side and FIG. 10 show the batter side. In FIG. 9, the 6×6 square sections (strike zone) inside are displayed in a mode reflecting whether each square section is advantageous or disadvantageous to the pitcher side, i.e. displayed in a specified number of colors in this embodiment. Specifically, the display mode is in five levels in a decreasing order of advantage to the pitcher side using color gradients, for example, red (e.g. the square section of the first pitch), orange (e.g. substantially all the square sections in the right line), a specified color indicating neither advantage nor disadvantage (e.g. the square sections substantially in a central part), light blue (the square sections near the left lower corner) and blue (e.g. the square section of the second pitch). The square sections on the outer periphery are in a uniform different color. The above advantage/disadvantage of the pitch sequence history and that of the square sections to the pitcher side are different concepts. The former is given as advantage/disadvantage information for the selection of the pitch sequence history pattern by the pitch sequence history generating section 303 and the latter is given as advantage/disadvantage information (reflected as the sizes of the image marks MG) for the position designation by the setting section 305.

The advantage/disadvantage of each square section is set as follows. Specifically, for the pitcher side, the closer to the square sections with the pitch record in the pitch sequence history and the later in the pitch sequence (i.e. the closer in time to the one-pitch match), control is regarded to be stable (from the pitch record) and the pitch is regarded to be advantageous. In the opposite case, the pitch is regarded to be disadvantageous (because of no pitch record). Such a color-coded display can be used to think ahead of the strategy when the game player at the pitcher side designates the pitching position of one decisive pitch. In other words, the setting section 305 sets a magnification rate for the mark image MG1 of the size set according to the player parameters, thereby changing the size. The size of the mark image MG1 becomes smaller if the square section of the color advantageous to the pitcher side (with respect to no color) is designated as a position while becoming larger in the opposite case. The mark image MG1 is reduced in size by a specified rate, e.g. by 5% between red and orange if the advantageous square section is designated while being enlarged in size by a specified rate, e.g. by 5% in the opposite case (light blue, blue). The magnification rate may be changed between red and orange or between light blue and blue.

Figure 9C:
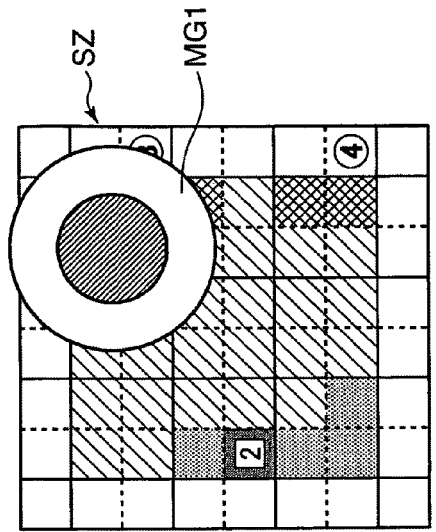
Figure 9D:
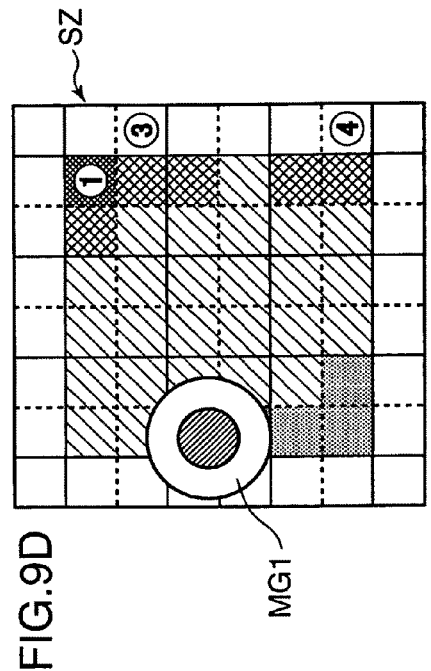
Figure 9A:
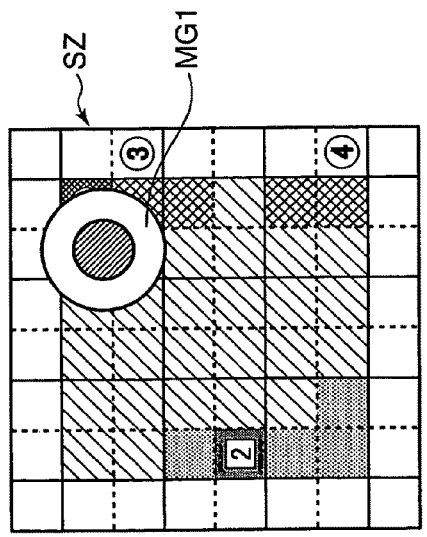
Figure 9B:
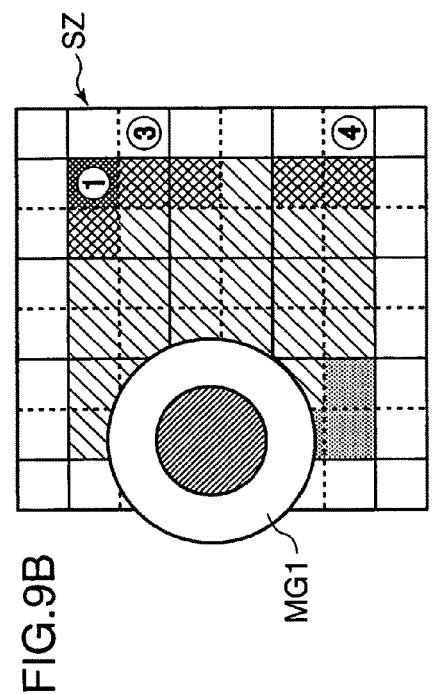

In FIG. 9A is assumed a case where a right upper position (inside the orange square section) is designated as the pitching position, and the mark image MG1 is reduced in size (difficult to hit) (i.e. the square section with many pitch records is regarded as a position where the ball location is stable from the standpoint of the pitcher side) since this position is close to the first and third pitches in the pitch sequence history. On the other hand, in FIG. 9B is assumed a case where a left middle position (inside the light blue square section) is designated as the pitching position, and the mark image MG1 is enlarged in size (easy to hit) (i.e. the square section with less pitch records is regarded as a position where the ball location is unstable from the standpoint of the pitcher side) since this position is close to the second pitch of the pitch sequence history, but close to the blue square sections set because they are largely distant from other pitching positions. It is basically set in accordance with the above rule whether each square section is advantageous, neutral or disadvantageous with reference to the pitch sequence history, but such setting may be made beforehand in consideration of the above rule in a mode in which the pitch sequence histories are generated beforehand.

In FIG. 9C is assumed the case where the right upper position (inside the orange square section) is designated as the pitching position, and the mark image MG1 is enlarged in size (easy to hit) (i.e. the square section with many pitch records is regarded as a position accustomed to eyes and easier to hit from the standpoint of the batter side) since this position is close to the first and third pitches in the pitch sequence history. On the other hand, in FIG. 9D is assumed the case where the left middle position (inside the light blue square section) is designated as the pitching position, and the mark image MG1 is reduced in size (difficult to hit) (i.e. the square section with less pitch records is regarded as a position unaccustomed to the eyes and difficult to hit from the standpoint of the batter side) since this position is close to the second pitch of the pitch sequence history, but close to the blue square sections set because they are largely distant from other pitching positions. It is basically set in accordance with the above rule whether each square section is advantageous, neutral or disadvantageous with reference to the pitch sequence history, but such setting may be made beforehand in consideration of the above rule in the mode in which the pitch sequence histories are generated beforehand.

On the other hand, for the batter side, the closer to the square sections with the pitch record in the pitch sequence history and the later in the pitch sequence (i.e. the closer in time to the one-pitch match), the pitch is accustomed to the eyes of the batter and is advantageous to him. In the opposite case, the pitch is regarded to be disadvantageous. Such a color-coded display can be used to think ahead of the strategy when the game player at the batter side designates the batting position of one decisive swing. In other words, the setting section 305 sets a magnification rate for the mark image MG2 of the size set according to the player parameters, thereby changing the size. The size of the mark image MG2 becomes larger if the square section of the color (red or orange) advantageous to the batter side is designated as a position while becoming smaller in the opposite case (light blue or blue). The mark image MG2 is enlarged in size by a specified rate, e.g. by 10% if the advantageous square section is designated while being reduced in size by a specified rate, e.g. by 10% in the opposite case. The magnification rate may be changed between red and orange or between light blue and blue.

Figure 10A:
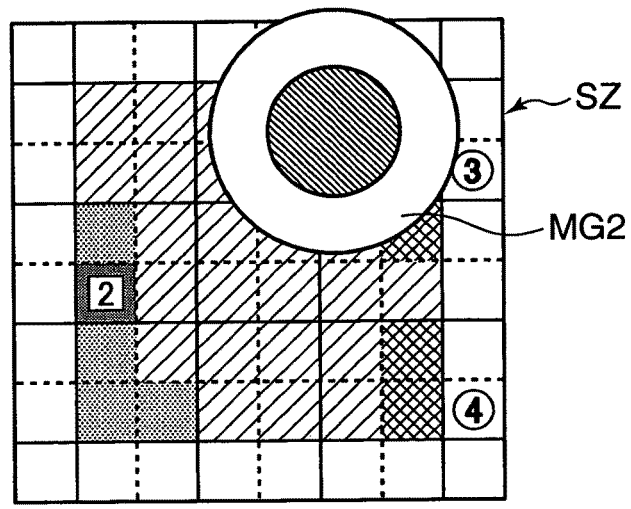
Figure 10B:
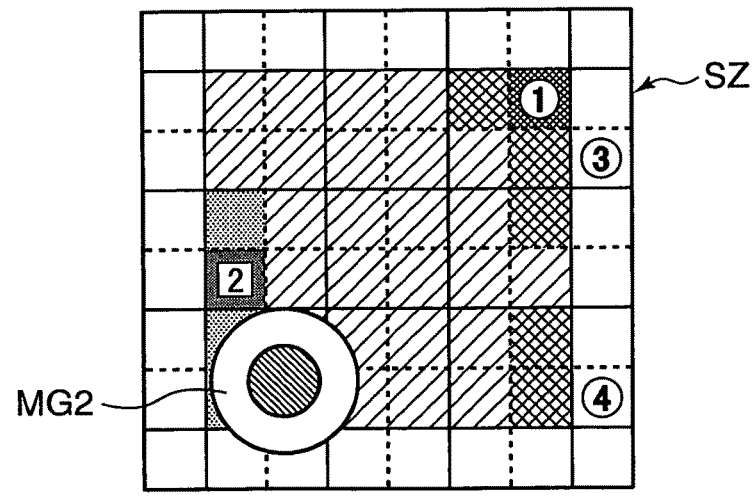

In FIG. 10A is assumed a case where a right upper position (inside the orange square section) is designated as the batting position, and the mark image MG2 is enlarged in size (easy to hit) (i.e. the square section with many pitch records is regarded as a position accustomed to the eyes of the batter and easy to hit) since this position is close to the first and third pitches in the pitch sequence history. On the other hand, in FIG. 10B is assumed a case where a left lower position (inside the light blue square section) is designated as the batting position, and the mark image MG2 is reduced in size (difficult to hit) (i.e. the square section with less pitch records is regarded as a position unaccustomed to the eyes of the batter and difficult to hit) since this position is close to the second pitch of the pitch sequence history, but in the blue square section. The classification of the square sections concerning whether they are advantageous or disadvantageous is not limited to the one in five levels, and the number of levels may be any arbitrary number equal to or greater than 2.

The setting section 305 selects the pitch sequence history from 30 pitch sequence histories of 10 each of the advantageous, neutral and disadvantageous patterns, for example, by referring to TABLE-1.

pitcher is 40% (=25%+15%), the occurrence ratio of the neutral pitch sequence history pattern is 35% (=15%+20%), and the occurrence ratio of the advantageous pitch sequence history pattern is 25% (=10%+15%). The respective occurrence ratios can be appropriately allocated. For the pitch sequence history selection method, the parameters used are not limited to the physical strength parameter and the ball location parameter, and other parameters may be added or the above parameters may be replaced by other parameters. The physical strength parameter may be treated as a pitcher evaluation index indicating the current condition of the pitcher in the game progress such as the ball location parameter. Accordingly, the physical strength parameter is not limited to the physical strength value, and various parameters for the evaluation of the pitcher, which vary as the game proceeds, can be used.

Figure 11:
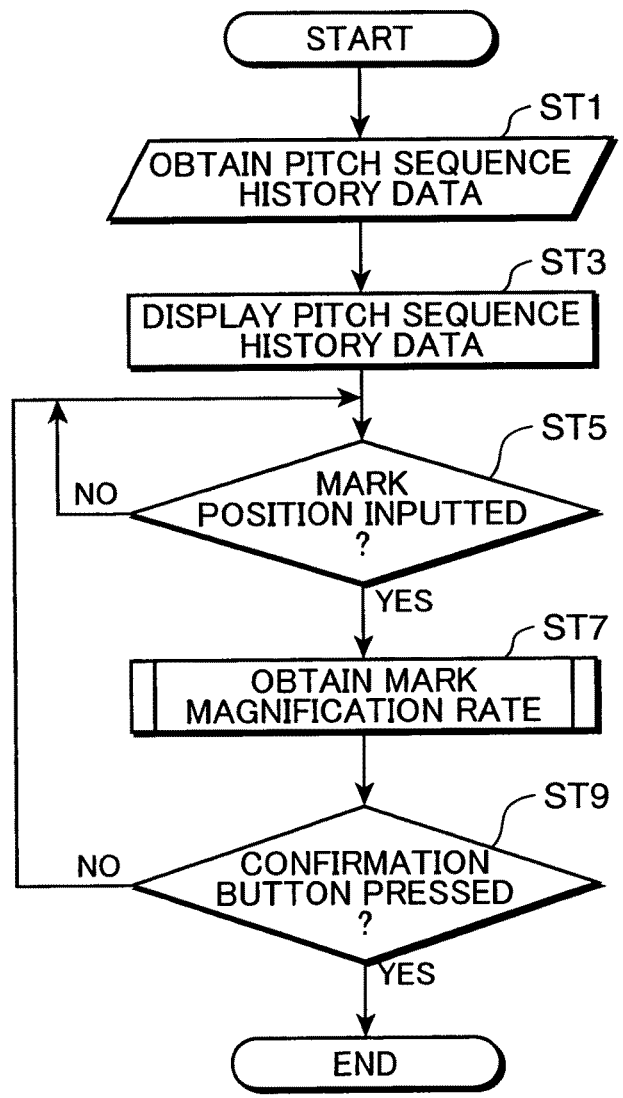
FIG. 11 is a flow chart relating to position designation in a course designation mode.
Figure 12:
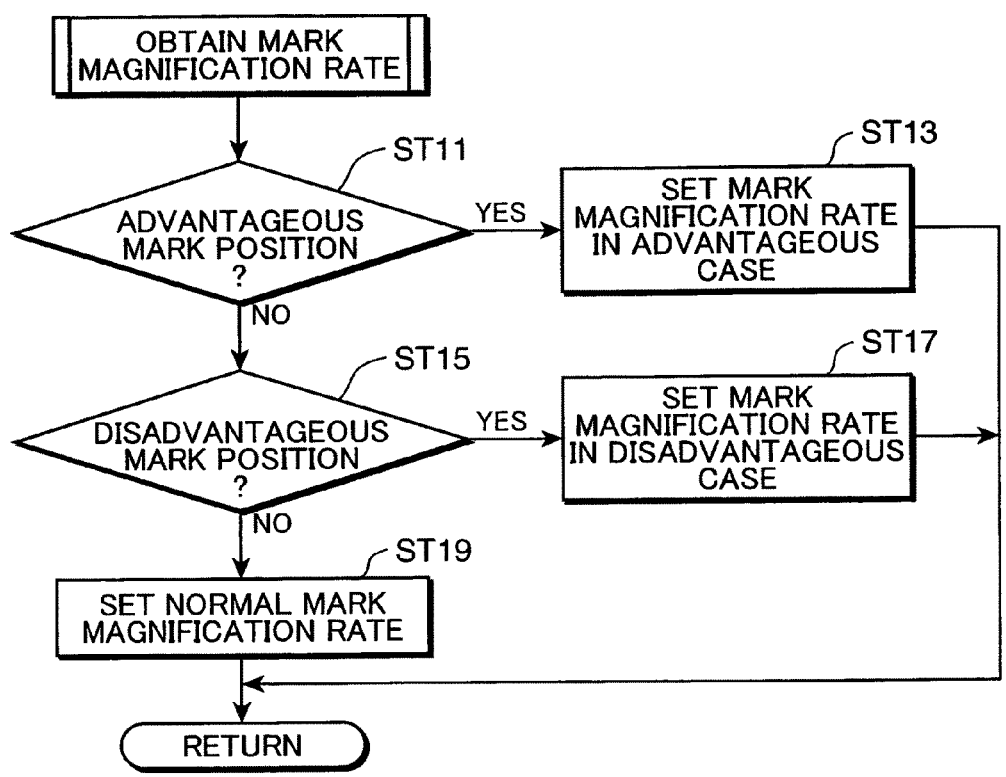
FIG. 12 is a flow chart relating to the setting of a mark magnification rate at the pitcher side, FIG. 13 are diagrams showing overlapping degrees of central circle portions and outer ring portions of mark images.

FIG. 11 is a flow chart relating to position designation in a course designation mode, and FIG. 12 is a flow chart relating to the setting of a mark magnification rate at the pitcher side and at the batter side. In FIG. 11, when the sequence is started, the pitch sequence history data is selected (obtained) based on TABLE-1 (Step ST1) and displayed on the screen (Step ST3). Subsequently, it is judged whether or not the mark position has been inputted (Step ST5) and, if the input has been made, the mark magnification rate is set (Step ST7) in accordance with the flow chart of FIG. 12 and the mark image MG having the size thereof changed at the set magnification rate is displayed on the screen. Subsequently, it is judged whether a confirmation button has been pressed (Step ST9). Unless this button has been pressed, it is judged whether or not the mark

TABLE 1

|  | PS: YELLOW OR MORE | PS: RED | BALL LOCATION ≥AVERAGE | BALL LOCATION <AVERAGE |
|---|---|---|---|---|
| Disadvantageous to pitcher | 15% | 25% | 15% | 15% |
| Neutral to pitcher | 20% | 15% | 15% | 20% |
| Advantageous to pitcher | 15% | 10% | 20% | 15% |

(PS: physical strength)

Specifically, as shown in TABLE-1, an occurrence ratio of the pitch sequence history pattern is set based on a physical strength parameter and a ball location parameter of the pitcher. According to this occurrence ratio, one pitch sequence history is selected. The physical strength parameter is a value at each point of time attained as a physical strength value set as an initial value beforehand changes according to the game status (swing and miss, hit homerun, the number of hits, points attained) and the pitching content (the number of pitches) in the game progress. If the physical strength value is a specified normal value, a physical strength mark displayed at a specified position of the screen is in red. If the physical strength value drops to a specified threshold value, the physical strength mark changes from red to yellow. The physical strength value may be displayed in two colors of red and yellow or a specified number of color variations (e.g. orange) may be provided between red and yellow. The ball location parameter is the one set beforehand for the pitcher. The physical strength parameter and the ball location parameter involve at specified ratios, e.g. both at 50%. For example, if it is assumed that the physical strength value is in red for the physical strength parameter and the ball location is below average for the ball location parameter, the occurrence ratio of the pitch sequence history pattern disadvantageous to the position has been successively inputted and the mark is displayed on the screen after the size thereof is changed at the magnification rate corresponding to the designated position. Accordingly, the game player can select a proper position while confirming the mark size until finding out a desired position. When the confirmation button is pressed (even in a mode of automatically determining a position immediately before as a designated position upon the elapse of a specified time in a state where no input is made in stead of using the confirmation button (see FIG. 8)), this flow ends, assuming that the designated position has been confirmed.

Next, in the processing of FIG. 12, it is already known that the own player is at the pitcher side or at the batter side. Thus, in FIG. 12, it is judged whether or not the position of the designated square section is advantageous to the own player (Step ST11). This routine proceeds to Step ST15 if this judgment result is negative, whereas a mark magnification rate in the advantageous case is set for the mark image set based on the above player parameters (Step ST13) if this judgment result is affirmative. Specifically, the mark magnification rate is decreased if the own player side is the pitcher side while being increased if it is the batter side. In Step ST15, it is judged whether or not the position is disadvantageous to the own player side. This routine proceeds to Step ST19 if this judgment result is negative, whereas a mark magnification rate in the case of disadvantage is set for the mark image set based on the above player parameters (Step ST17) if this judgment result is affirmative. Specifically, the mark magnification rate is increased if the own player side is the pitcher side while being decreased if it is the batter side.

If the judgment result is negative in both Steps ST11 and ST15, a normal mark magnification rate is set in Step ST19 and this flow ends. In this embodiment, the normal mark magnification rate is a magnification rate of 1×, which is the mark size set based on the above player parameters.

In the above cases of FIGS. 9C and 9D, the processing shown in FIG. 12 is performed as follows. Specifically, in FIG. 12, it is judged whether or not the position of the designated square section is advantageous to the pitcher (Step ST11). This routine proceeds to Step ST15 if this judgment result is negative, whereas a mark magnification rate in the case advantageous to the pitcher is set (Step ST13) if this judgment result is affirmative. In Step ST15, it is judged whether or not the position is disadvantageous to the pitcher. This routine proceeds to Step ST19 if this judgment result is negative, whereas a mark magnification rate in the case disadvantageous to the pitcher is set (Step ST17) if this judgment result is affirmative. If the judgment result is negative in both Steps ST11 and ST15, a normal mm is set in Step ST19 and this flow ends. In this embodiment, the normal mark magnification rate is a magnification rate of 1×, which is the mark size set based on the above player parameters.

The radii of the central circle portions R11, R21 and the widths of the ring portions R12, R22 of the mark images MG1, MG2 having the sizes thereof set as above influence an overlapping degree of the both mark images MG1, MG2. In other words, there are cases where the mark images MG1, MG2 do not overlap at all, only the ring portions R12, R22 overlap, the ring portion R12 or R22 overlaps the central circle portion R21 or R11 of the opposite mark image and the central circle portions R11, R21 overlap. The overlapping degrees of the respective cases are reflected on the battle result. This is described later with reference to FIGS. 13, 14 and 15.

The action setting section 306 generates information necessary to determine the battle result from the input operation information from the operation unit 10A and some of the player parameters, i.e. data to be transmitted to the opponent game apparatus in accordance with the selection items shown in FIG. 20. Here, out of the information inputted from the operation unit 10A, card placed position information from the image pickup unit 11 is reflected on the determination of the level of an attribute, for which a plurality of levels are set for action modes, in order to virtually set an action mode of the player character.

The level of this attribute is a level when the player throws at full power or with power saved (pitching power) if the player is a pitcher and a level of power of swinging a bat (swing power) if the player is a batter. Specifically, in the case of the pitcher, the level of the attribute is to increase the ball speed by throwing at full power, decrease a meet rate and increase the amount of stamina consumption if the player card 9 is located before the central position of the placing surface, whereas it is to save (decrease) the ball speed, increase the meet rate and reduce the amount of stamina consumption if the player card 9 is located behind the central position. The amount of stamina consumption is managed beforehand and stamina is increased during the offense, assuming that the pitcher is at bench during the offense. In the case of the pitcher, stamina is decreased by an amount preset according to the pitching power.

In the case of the batter, the level of the attribute is to increase power to more strongly swing the bat while decreasing a value of the meet rate if the player card 9 is located before the central position of the placing surface, whereas it is to save power to less strongly swing the bat while increasing the meet rate if the player card 9 is located behind the central position. Power variation in the case of the batter is reflected on the flying distance and speed of a hit ball, the trajectory of the hit ball, i.e. the vertical angle of the hit ball and also a hitting rate.

When the "sign" (command) button is selected in FIG. 20 and any one of the particulars is selected at the defense side or offense side, this selected content is received by the receiving section 304 and the action setting section 306 confirms this selected content as a command selection result. This command selection result is reflected on a processing of changing the defense position of a fielder or a base running processing of a runner by simulating an actual baseball game (i.e. in accordance with a baseball rule control program) by the unit sequence executing section 310 to be described later.

The action setting section 306 generates pitcher data including "release timing", "pitch variation", "selected command item", "pitching position" and "attribute level (full power to saved power)" and batter data including "swing timing", "selected command item", "batting position" and "attribute level (full swing to meet)" as data to be transmitted. The "release timing" of the pitcher data is set by a random processing of a deviation from the "release" (best release timing) among the pitcher parameters using a random number generator or the like. The "pitch variation" is set in consideration of the command information and the attribute level out of various breaking balls in the pitcher parameters. The "pitching position" and "batting position" are set based on the parameters of the both pitcher and batter by the CPU unless the "course designation" button is selected on the screen of FIG. 20. The batter data "swing timing" is set by a random processing of a deviation from the "swing timing" (best swing timing) among the fielder parameters using the random number generator or the like.

The communication processing section 307 transmits specified information set by the setting section 305 and the action setting section 306 based on the selected and instructed contents from the operation unit 10A to the other game apparatus. In this way, the respective game apparatuses can possess the same information by receiving data from the opponent game apparatus.

The battle result setting section 308 determines a batting result. This battle result setting section 308 sets the battle result by different methods in the case where the "course designation" button was selected and in other cases. Specifically, unless the "course designation" button was selected, the battle result setting section 308 calculates, for example, a hitting probability of the batter character (hit rate probability) using a specified arithmetic expression from the pitcher parameters, the batter parameters and the exchanged data and performs a processing of determining whether or not the batter character will swing strikeout and the trajectory (strength of the hit ball) when the bat character meets the ball character in accordance with the calculated probability (a hitting judgment processing). At this time, the stamina consumption amount is also used as a coefficient.

On the other hand, if the "course designation" button was selected, a hitting judgment processing corresponding to the "course designation" is performed by the battle result setting section 308. The hitting judgment processing is performed by determining a hitting level based on the overlapping degree of the mark images MG1, MG2 and a hitting percentage (%) as described later.

Figure 13A:
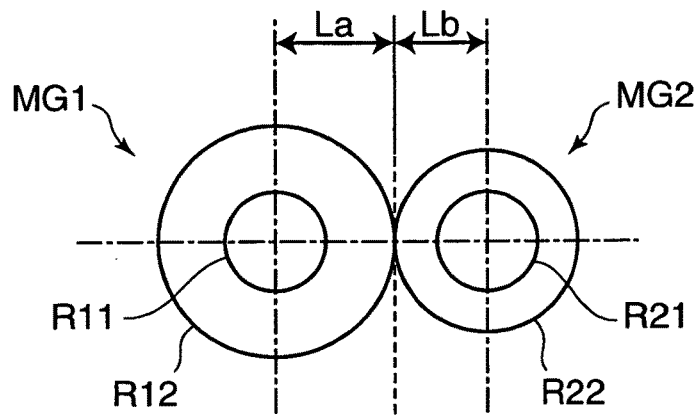
Figure 13B:
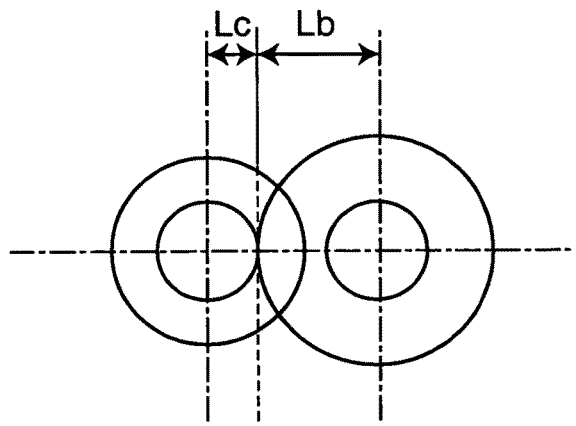
Figure 13C:
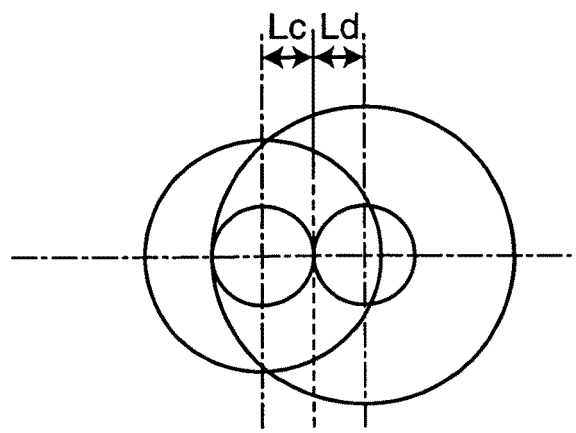
Figure 14:
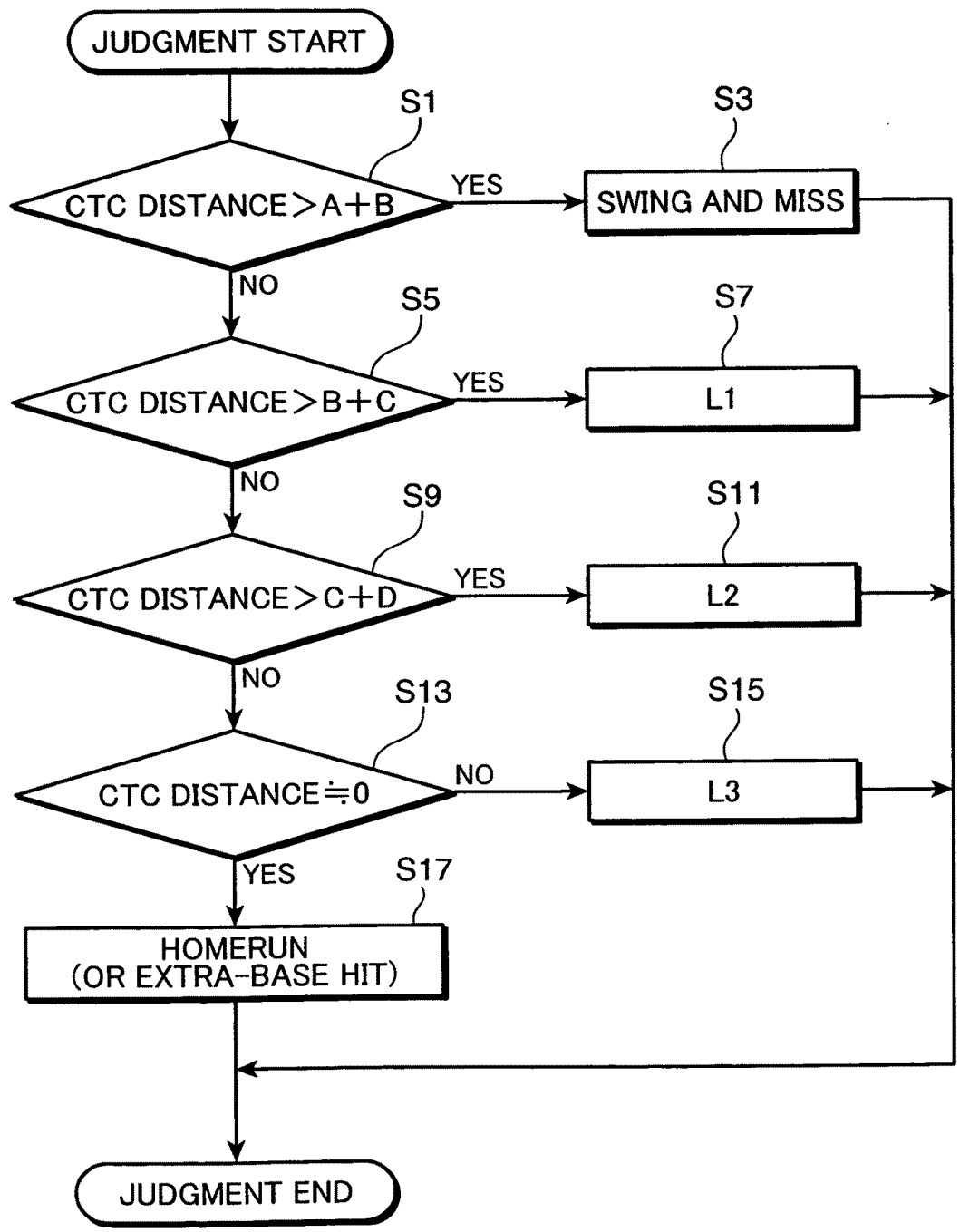
FIG. 14 is a flow chart for determining a hitting level corresponding to an overlapping degree.

FIG. 13 are diagrams showing overlapping degrees of the central circle portions R11, R21 and the outer ring portions R22, R21 of the mark images, and FIG. 14 is a flow chart for determining a hitting level corresponding to an overlapping degree. FIG. 13A shows a state where the ring portions R12, R22 of the mark images MG1, MG2 are in contact, FIG. 13B shows a state where the outer periphery of the ring portion R22 of the mark image MG2 is in touch with that of the central circle portion R11 of the mark image MG1, and FIG. 13C shows a state where the central circle portions R11, R21 of the mark images MG1, MG2 are in touch. In FIG. 13, La, Lb are radii from the centers of the mark images MG1, MG2 to the outer peripheries of the ring portions R12, R22, Lc is a radius of the central circle portion R11 (of the mark image MG1 here) and Ld is a radius of the central circle portion R21 (of the mark image MG2 here).

In FIG. 14, it is first judged whether a center-to-center distance of the mark images MG1, MG2 is longer than (La+Lb) (Step S1). If the center-to-center distance is longer, there is no overlapping, wherefore swinging strikeout is set as the battle result (Step S3). On the other hand, if the center-to-center distance is equal to or shorter than (La+Lb), it is judged whether or not the center-to-center distance is longer than (Lb+Lc). If the center-to-center distance is longer, it is a case between those shown in FIGS. 13A and 13B. Thus, a hitting processing of level 1 is set as the battle result. On the other hand, if the center-to-center distance is equal to or shorter than (Lb+Lc), it is then judged whether the center-to-center distance is longer than (Lc+Ld). If the center-to-center distance is longer, it is a case between those shown in FIGS. 13B and 13C. Thus, a hitting processing more advantageous to the batter than level 1, e.g. a hitting processing of level 2 at which a hit ball speed is faster is set as the battle result. On the other hand, if the center-to-center distance is equal to or shorter than (Lc+Ld), it is then judged whether the center-to-center distance is longer than a specified value of substantially zero. If the center-to-center distance is longer, there is at least more overlapping than in FIG. 13C. Thus, a hitting processing more advantageous to the batter than level 2, e.g. a hitting processing of level 3 at which a hit ball speed is faster is set as the battle result. On the other hand, if the center-to-center distance is equal to or shorter than the specified value of substantially zero (i.e. the centers substantially coincide), a hit more advantageous to the batter than level 3, typically homerun is set as the battle result.

Further, the battle result setting section 308 performs a processing of determining the battle result from the hitting level value determined in FIG. 14, for which the "course designation" was selected, and the hitting percentages (%) corresponding to the overlapping degrees of the mark images MG1, MG2 in the respective levels.

Here, the hitting percentages (%) corresponding to the overlapping degrees of the mark images MG1, MG2 in the respective levels are described with reference to FIG. 13. In the level 1, i.e. in a mode where only the ring portions R12, R22 overlap as in a state from FIG. 13A to FIG. 13B, a percentage value corresponding to the overlapping degree is calculated by 100×((La+Lb)−Lo)/((Lo−(Lc+Ld)) if the center-to-center distance is Lo. Specifically, the percentage value is 0% in the state of FIG. 13A and is 100% in the state of FIG. 13B. If the mark images MG1, MG2 have the same shape, the ring portion R22 touches the other central circle portion R11 when the ring portion R12 touches the other central circle portion R21. In this case, the processing is performed with the percentage value set at 100%. If the mark images MG1, MG2 have different shapes, the ring portion R22 may not touch the other central circle portion R11, for example, when the ring portion R12 touches the other central circle portion R21. In this case, the percentage value is set below 100%.

In the level 2, i.e. in a mode where at least either one of the ring portions R12, R22 overlap the other central circle portion R21, R11 as in a state from FIG. 13B to FIG. 13C, a percentage value corresponding to the overlapping degree is calculated by 100×((La+Ld)−Lo)/(La−Lc) if La>Lb and the center-to-center distance is Lo. In other words, the percentage value is 0% in the state of FIG. 13B and 100% in the state of FIG. 13C.

In the level 3, i.e. in a mode where the mutual reference positions coincide in a state from FIG. 13C, a percentage value corresponding to the overlapping degree is calculated by 100×((Lc+Ld)−Lo)/(Lc+Ld) if the center-to-center distance is Lo. In other words, the percentage value is 0% in the state of FIG. 13B and 100% in the state of FIG. 13C.

As described above, the respective levels 1, 2 and 3 indicate a degree of cleanly hitting the thrown ball character by the swung bat character. Further, in the respective levels, realistic sensation is produced by setting the cleanly hitting degrees continuously or in many steps (in more steps than the levels 1, 2 and 3) according to the overlapping degrees of the mark images. For example, if it is assumed that the level indicates a power rate (0 to 100%) for determining the trajectory (hit ball speed) after hitting by the bat with the level 1 set to 20 to 40%, the level 2 set to 50 to 70% and the level 3 set to 80 to 100% and the overlapping degree of the mark images is 50% in the level 1 here, the speed of the trajectory is set to 30%. In other words, a trajectory (hit ball speed) at 30% batting power of this character is given to the hit ball character. By such level classification, the strength of the hit ball is reflected not proportionally, but stepwise as a whole.

Figure 15:
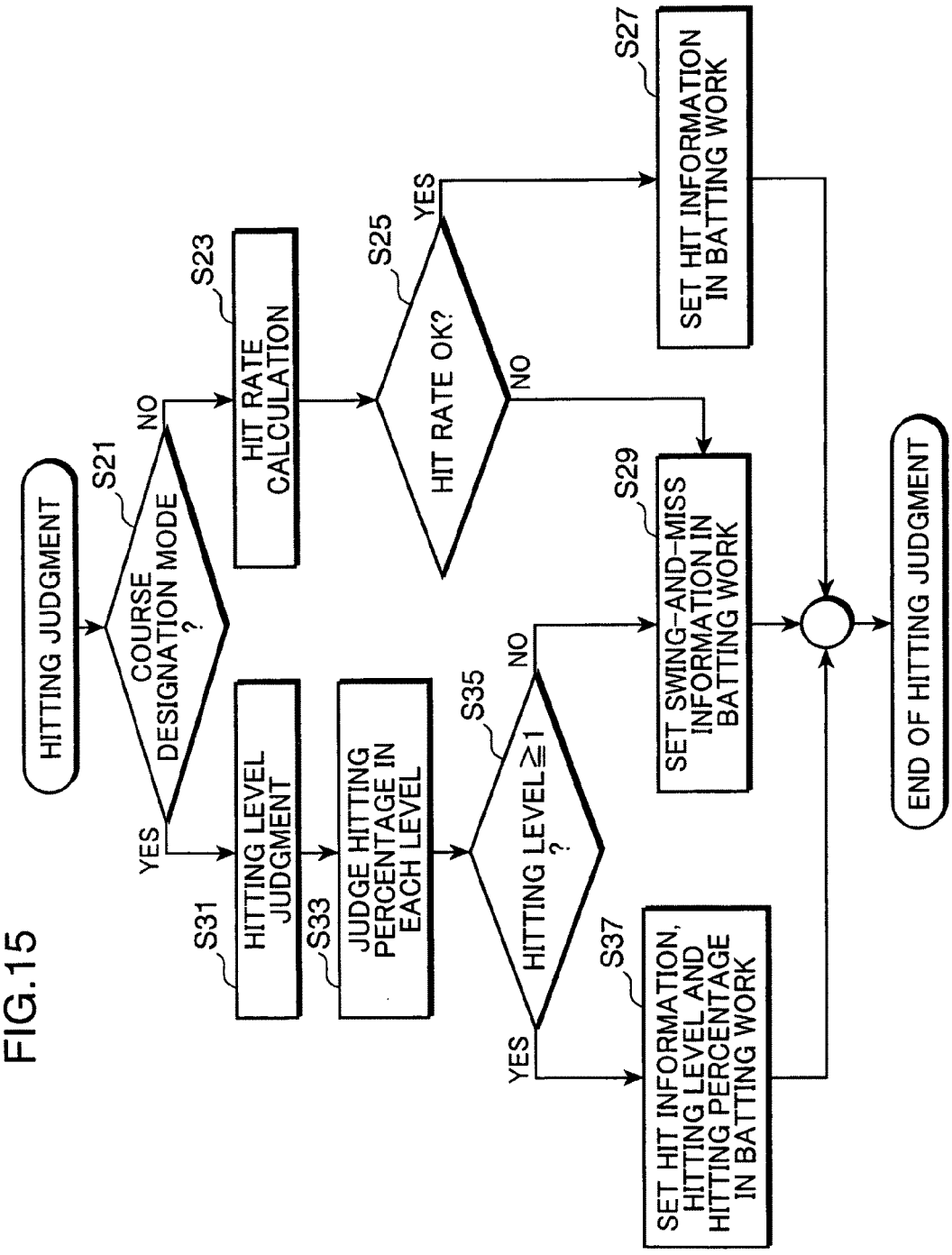
FIG. 15 is a flow chart showing an example of a hitting judgment processing.
Figure 19:
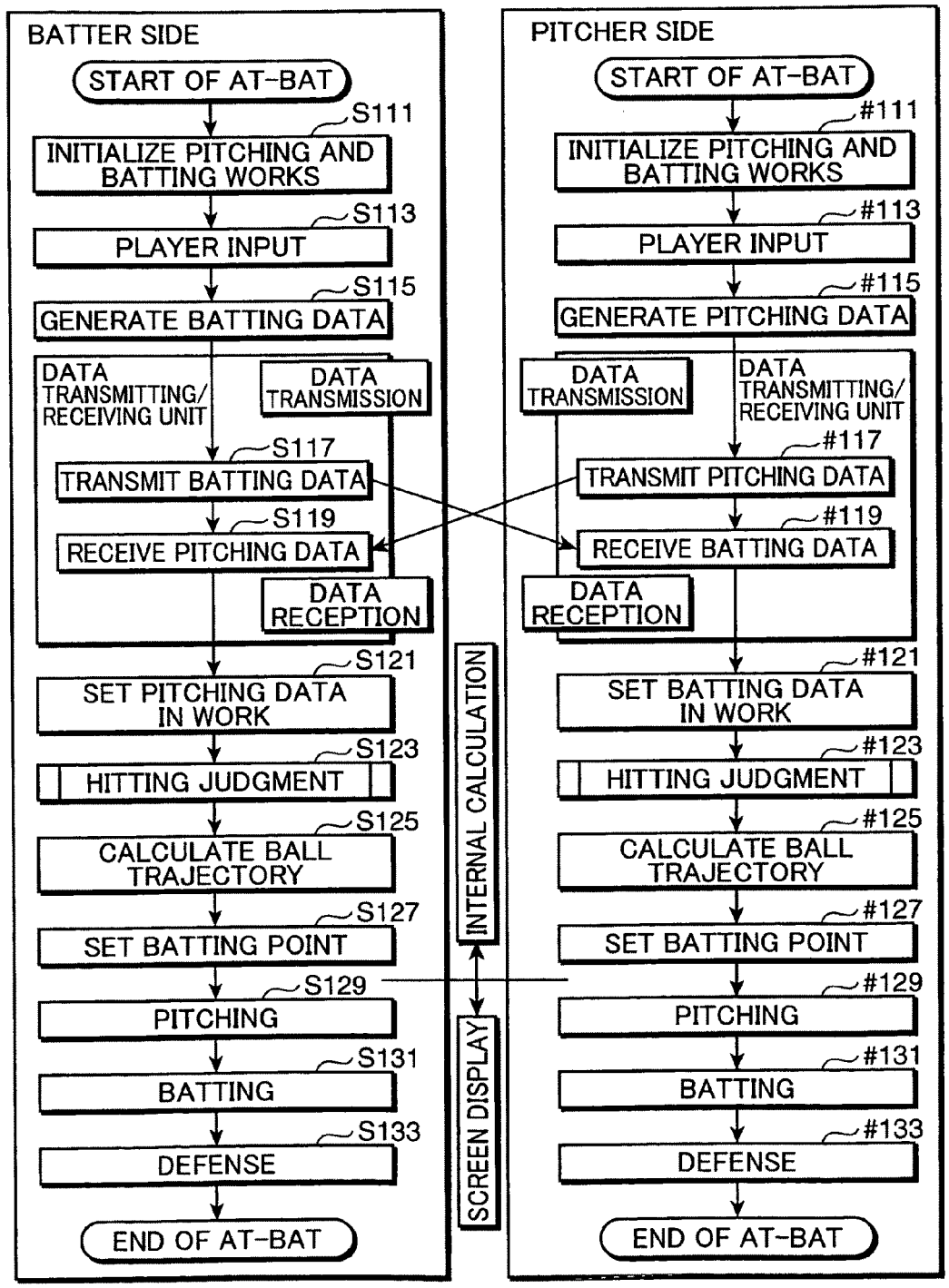
FIG. 19 is a flow chart showing the procedure of an at-bat flow included in a sequence execution processing shown in Step S45 of FIG. 16.

FIG. 15 is a flow chart showing an example of the hitting judgment processing (detail of Step S123 of FIG. 19). In FIG. 15, it is judged whether or not the "course designation" button was selected on the screen of FIG. 20 and, unless this button was selected, this routine proceeds to Step S23 to perform a normal hitting rate calculation. Specifically, as described above, a hitting probability of the batter character is calculated using a specified arithmetic expression from the pitcher parameters, the batter parameters and the exchanged data and it is judged whether or not the calculated probability (hitting rate) is equal to or higher than a specified value (Step S25). A hitting processing corresponding to the hitting rate is set in a batting work in the RAM 3002 (Step S27) if the specified value is reached, whereas a swinging strikeout processing is set in the batting work in the RAM 3002 (Step S29) unless the specified value is reached.

On the other hand, if the "course designation" button was selected on the screen of FIG. 20, it is judged whether or not the hitting level is the level 1 or higher (Step S35) after performing a hitting level judgment (Step S31) and a hitting percentage (%) judgment (Step S33). The swinging strikeout processing is set in the batting work in the RAM 3002 (Step S29) unless the hitting level has reached the level 1, whereas pieces of information including the hit information, the hitting level and the hitting percentage (%) are set in the batting work in the RAM 3002 (Step S37) if the hitting level is the level 1 or higher.

The game status judging section 309 has a game managing function of managing the game status, exchanges the player parameters of the respective player cards 9 used by the respective game players upon starting the game, transmits and receives the player parameters of the players in the event of substituting the player character, and judges the game status (points, pinch, chance, etc.) from the number of executed sequences, i.e. the number of innings, the number of out counts and the execution results of the respective sequences until immediately before. If this judgment result indicates a special status set beforehand (e.g. the final inning) or a state to be noticed (bases loaded, etc.), it is also reflected on the battle result determined by the battle result setting section 308, i.e. on a processing of determining a hit or an out. If the "course designation" button was selected, the widths of the ring portions R12, R22 of the mark images are, for example, set using these as parameters. In this way, the game can be made more interesting. Further, the game status judging section 309 transmits data on the pitching position and the batting position as history data to the center server while relating it to the player if the "course designation" item was selected.

The image display controlling section 302 may set the same display images for the pitcher side and the batter side (viewpoint and viewing direction of a virtual camera coincide). However, in this embodiment, the same object is imaged from preferable different viewpoint positions to improve the visibility of the game progress for the respective game players.

The unit sequence executing section 310 successively calculates the motions of the pitcher character, the fielder characters, the batter character and the runner character(s) and the ball character simulating the ball from the pitching by the pitcher to the batting and further a series of motions corresponding to the batting result, and successively introduces the successive calculation results to the image display controlling section 302.

The unit sequence executing section 310 includes a pre-processing section 311 and a post-processing section 312. The pre-processing section 311 obtains a processing result before a throwing motion of the ball character by the pitcher character displayed on the monitor 3 using the determined contents by the action setting section 306 and the parameters used at that time. The unit sequence executing section 310 calculates the respective data including the pitching position, the pitching speed ("ball speed", "release", etc. among the pitcher parameters are used), the pitch variation, the trajectory of the hit ball, and the passage position above the home base if the game player is at the pitcher side, and calculates a bat swing path, a result as to whether or not the bat will meet and the parameters "hitting speed", "hitting angle" and "hitting speed attenuation rate" in an instance of hitting by the bat when the result of bat meeting was obtained if the game player is at the batter side. Out of the respective calculations, the trajectory of the thrown ball character and the bat swing path may be calculated also in consideration of general dynamics and air resistance or may be calculated by a processing at a speed required for the game processing using a simulation calculation approximate to actual motions.

The post-processing section 312 performs a processing for actions made after the pitching motion, i.e. performs calculations for causing the fielder characters to make natural defense motions based on the motions of the ball character and the runner character, causing the runner character to make a natural base running motion based on the motions of the ball character and the fielder characters (the above is by the control program in compliance with the baseball rules), and causing the ball character to move based on data when the ball character meets the bat character on the monitor 3. Further, the post-processing section 312 calculates the hit ball speed after the batting and the hitting angle using the respective parameters "hit ball speed", "hitting angle" and "hit ball speed attenuation rate", which were obtained by the pre-processing section 311, in accordance with a displacement between the passage position of the ball character above the home base and the batting position of the bat character and a timing displacement between the passage of the ball character and the batting. In this case, more realistic sensation can be produced by varying the trajectory of the hit ball, for example, using the random number generator or the like.

The post-processing section 312 repeatedly performs the above calculations in specified cycles and introduces the calculation results to the image display controlling section 302, whereby the ball character, the pitcher character, the batter character, the fielder characters and the runner character(s) are displayed in an animated manner to realize a more realistic sequence processing.

The player card issuance processing section 313 gives an instruction to the player card issuance slot 6 to issue a specified number of, here, one player card from the player card storing portion inside the housing 1 in response to the end of the game. In this way, the game player can collect a different type of player card every time playing the game.

A baseball team including player characters sufficient to build one team and the respective parameters (pitcher parameters, fielder parameters) of these player characters, these characters being computer-controlled, is prepared beforehand in the ROM 3001, and the opponent strategy setting section 314 realizes a CPU competition with the game player using this single game apparatus and performs the processing of selecting the "course designations" item, the "signs" item, the attribute level, the battle result and the sequence execution processing. This opponent strategy setting section 314 basically causes the setting section 305, the action setting section 306, the battle result setting section 308, the game status judging section 309 and the unit sequence executing section 310 to equally function in the belonging game apparatus and performs a processing of displaying images on one monitor, assuming the presence of the opponent player.

FIG. 20 shows a game image at the time of starting a sequence when the player is at the batter side, FIG. 21 shows a game image at the time of a battle in a state where a pitching position and a batting position overlap when the player is at the batter side, and FIG. 22 is a diagram showing a game image in a state where a pitching position and a batting position overlap when the player is at the pitcher side. As shown in FIGS. 20 to 22, on the screen of the monitor 3, the opponent (team name) and contents (points, inning, etc.) relating to the game progress are displayed on the upper side of the screen and data on the competing batter and pitcher are displayed on the opposite sides of the screen in addition to the display of the game image. Further, team constituting member tables are displayed on the lower side of the screen. A strike zone image SZ is displayed at a central position of the screen. In this embodiment, this strike zone image SZ is partitioned into a plurality of square sections in vertical and horizontal directions similar to FIG. 8, information including advantage/disadvantage information is distinguishably displayed in each square section (this display is not shown), and the both mark images MG1, MG2 are displayed together in the strike zone image SZ in a superimposed manner.

Figure 16:
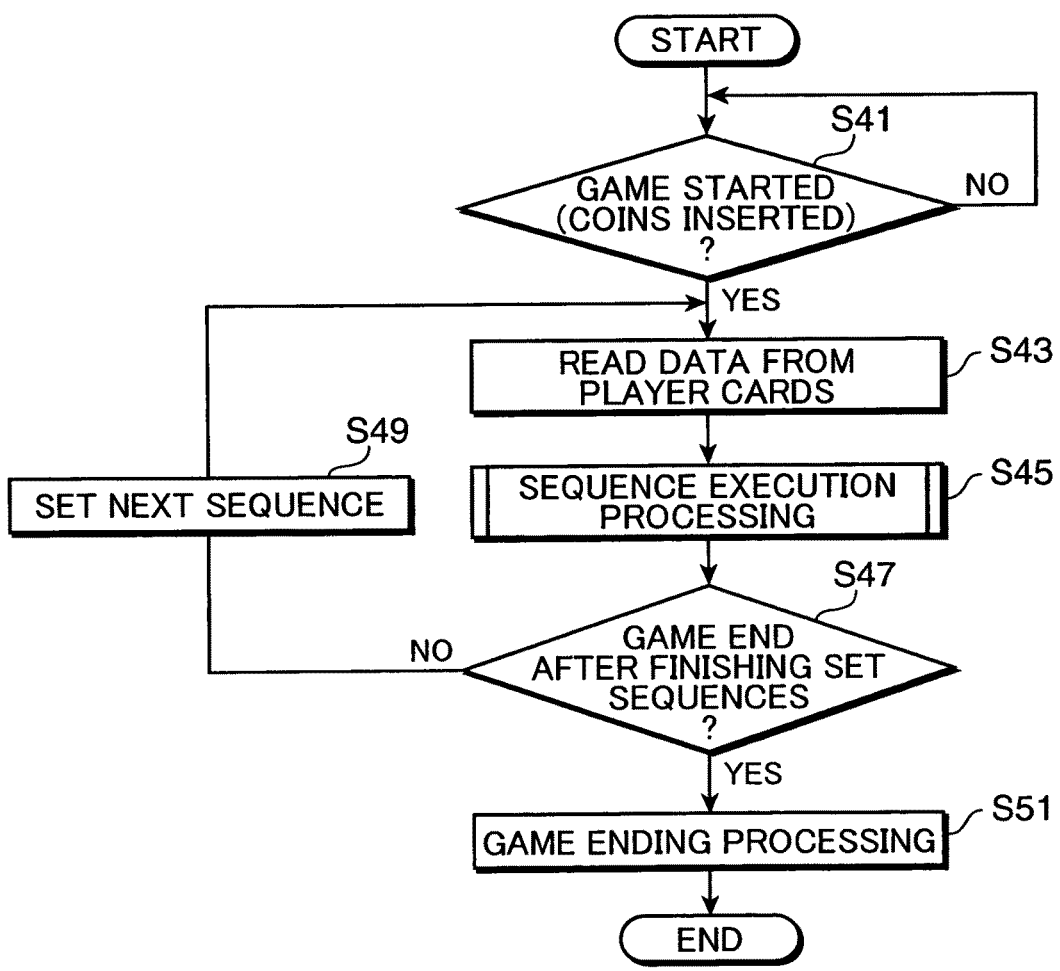
FIG. 16 is a flow chart showing the overall flow of the game.

FIG. 16 is a flow chart showing the overall flow of the game. First of all, when the insertion of coins is detected by the coin sensor 81 (Step S41), the image pickup unit 11 is activated to detect the placement of a necessary number of player cards 9 (nine in the baseball game) on the placing surfaces 20 and read the player identification data of the respective player cards 9 (Step S43). Subsequently, the game is started, data are exchanged with the opponent, and one sequence is executed to battle with one batter character (Step S45). Every time this sequence is finished, it is judged whether the game has been finished (Step S47). If there is any remaining out count or any remaining inning, this routine returns to Step S43 after setting a sequence for a battle with the next batter character. If the game has been finished in Step S47, an instruction to issue only one new player card 9 is given to end this flow after a game ending processing (Step S51), e.g. the presentation or the like of the result (game result) on the monitor 3.

Figure 17:
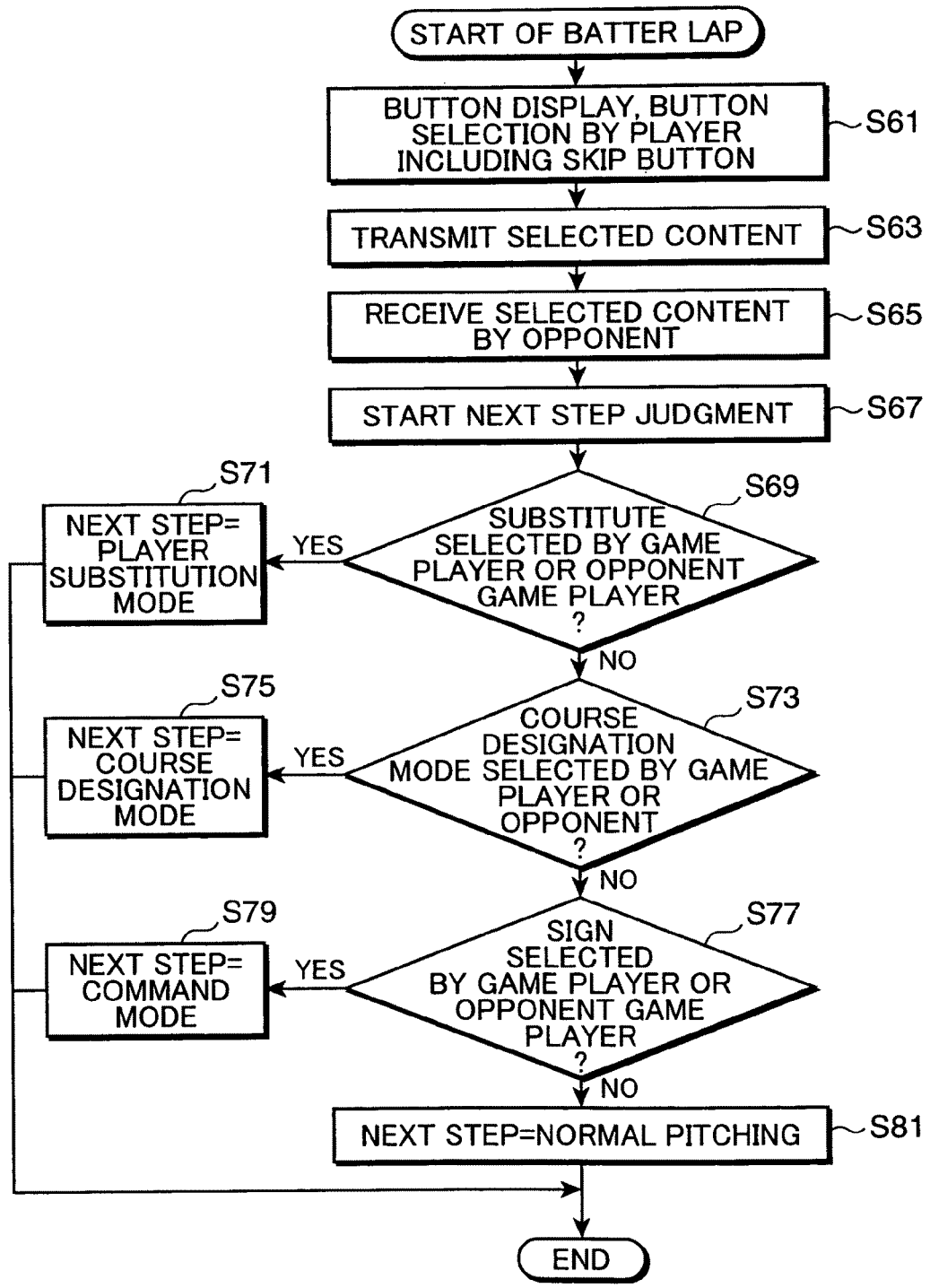
FIG. 17 is a flow chart showing a selection processing for a screen shown in FIG. 20.

FIG. 17 is a flow chart showing the selection processing using the screen shown in FIG. 20.

FIG. 20 shows a screen appearing at the start of one sequence, and the next batter is preparing to head for a batter's box. On the screen are displayed four buttons "sign", "pinch hitter/pinch runner", "course designation" and "skip". In FIG. 17, upon receiving the selection of any one of these buttons (Step S61), the receiving section 304 transmits the selected content to the competing other game apparatus (Step S63) and receives the content selected by the opponent game player from this other game apparatus (Step S65). In the processing of transmitting and receiving the selected contents, the game apparatus having selected earlier transmits the selected content first since there is a difference in time required for the selection.

Upon completing the reception of the selected content of the opponent side, a step judgment processing is performed next (Step S67). Specifically, an order of priority is set for "sign", "pinch hitter/pinch runner" and "course designation" and, in this embodiment, it is not possible to select two or more items. First of all, it is judged whether or not the game player or the opponent game player has selected to substitute a player (pinch hitter/pinch runner) (Step S69). If such a selection has been made, transition is made to a player substitution mode to switch the screen to such a specified screen as to guide the player substitution (Step S71). Unless the player substitution has been selected, it is judged whether or not the game player or the opponent game player has selected the "course designation" (Step S73). If such a selection has been made, transition is made to a "course designation" mode to display a screen of FIG. 21 (or FIG. 22) (Step S75). Unless the "course designation" has been selected, it is judged whether or not the game player or the opponent game player has selected the "sign" (Step S77). If such a selection has been made, transition is made to a "sign" mode to display buttons indicating the contents of various signs on the screen and the screen is switched to a specified screen urging the selection (Step S79). Further, if the "skip" has been selected or none of the buttons has been selected even upon the elapse of a specified time (NO in Step S77), a sequence processing and the display of a screen therefor are performed based on the pitching content and swing content set by the computer (Step S81).

There is no guarantee that the game player and the opponent game player playing this game against each other select the same item (button) on the screen of FIG. 20, and the following order of priority is set beforehand, assuming cases where different buttons were selected. Specifically, if either one of the game players presses the "pinch hitter/pinch runner" button, transition is made to the "player substitution" mode even if the other game player presses a different button. Further, if either one of the game players presses the "course designation" button, transition is made to the "course designation" mode even if the other game player presses the "sign" or "skip" button. Furthermore, if either one of the players presses the "sign" button, transition is made to the "sign" mode even if the other player presses the "skip" button.

Figure 18:
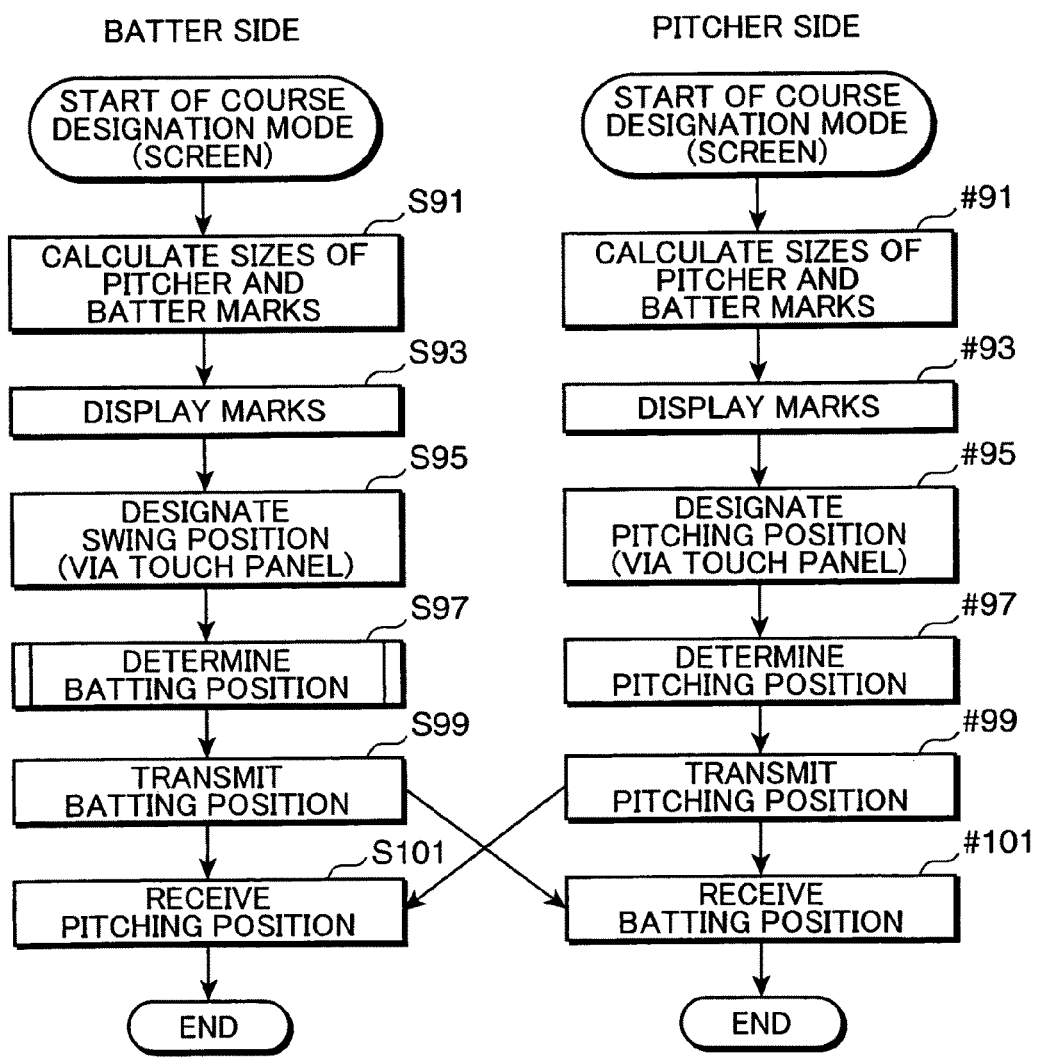
FIG. 18 is a flow chart showing the processing procedure of a "course designation" mode in Step S75.

FIG. 18 is a flow chart showing the processing procedure of the "course designation" mode in Step S75. Here is described a case where the own player is at the offense side and the opponent player is at the defense side. If the own player is at the defense side (i.e. the opponent player is at the offense side), a processing performed differs only in that the "batter side" and the "pitcher side" are replaced by each other and, hence, is not described.

Upon entering the "course designations mode", the size of the mark image MG1 of the batter character, i.e. the radius of the central circle portion R11 and the width of the ring portion R12, is set and the size of the mark image MG2 of the pitcher character as the opponent character, i.e. the radius of the central circle portion R21 and the width of the ring portion R22, is set (Step S91). Subsequently, only the mark image MG1 of the own character, i.e. the batter side is displayed at a suitable position, e.g. a central position, of the strike zone image SZ (Step S93). The game player can press the touch panel 10 at a desired position of the strike zone image SZ while watching this mark image MG1. When the game player presses the desired position of the strike zone image SZ as a designated position, a processing of moving the center of the mark image MG1 to this pressed position is performed (Step S95). The movement of the mark image MG1 to the designated position can be also realized by a method for dragging the mark image MG1 while pressing it. The game player confirms the swing position by pressing the confirmation button shown in FIG. 8 upon determining the designated position (Step S97). In other words, the flow chart of FIG. 11 is carried out until the game player determines the designated position, and the information on the confirmed batting position is transmitted to the opponent game apparatus via the communication unit 130 (Step S99) and the information on the designated batting position is received in the opponent game apparatus (Step S101) when the batting position is determined in Step ST9.

In this way, the own game apparatus calculates and sets the central circle portion R12 and the ring portion R12 of the mark image MG1 by referring to the pitcher parameters of the opponent character and the game status based on the data possessed by the game apparatus, receives information on the pitching position designated in the opponent game apparatus by the opponent game player and sends it to the image display controlling section 302. Thus, the mark images MG1, MG2 can be displayed together on the monitor 3 of the own game apparatus. The mark image MG2 is not displayed on the monitor 3 in this flow chart and, for example, is displayed at the time of a battle, in Step S123 of FIG. 19. In this way, since pieces of information are exchanged and the pitching position designated by the opponent side is displayed on the monitor 3 at least after the batting position is determined (confirmed) at the own side, the batting position is designated while predicting or assessing the opponent's strategy, wherefore a high game element can be maintained.

On the other hand, in the opponent game apparatus operated by the opponent game player at the pitcher side, the size of the mark image MG1 (mark image MG1 from the standpoint of the game apparatus of the opponent game player) of the pitcher character, i.e. the radius of the central circle portion R11 and the width of the ring portion R12 are set and the size of the mark image MG2 of the batter character, which is the character of the own game player side for the opponent game player, i.e. the radius of the central circle portion R21 and the width of the ring portion R22 are set (Step #91). Subsequently, only the mark image MG1 of the pitcher side is displayed at a specified position, e.g. in the center, of the strike zone image SZ (Step #93). The opponent game player can press the touch panel 10 at a suitable position of the strike zone image SZ while watching this mark image MG1. When the opponent game player presses a desired position of the strike zone image SZ as the designated position, a processing of moving the center of the mark image MG1 to this pressed position is performed (Step #95). The opponent game player confirms this pitching position (Step #97) by pressing the confirmation button shown in FIG. 16 upon determining the designated position. In other words, the flow chart of FIG. 11 is executed until the opponent game player determines the pitching position, and information on the confirmed pitching position is transmitted to the game apparatus of the own side via the communication unit 130 (Step #99) and information on the batting position designated in the game apparatus of the own side is received (Step #101) when the pitching position is determined in Step ST9.

In this way, the opponent game apparatus sets the central circle portion R21 and the ring portion R22 of the mark image MG2 by referring to the batter parameters, the game status and the pitch sequence history, receives the information on the batting position designated in the game apparatus by the game player and transmits it to the image display controlling section 302 of the other game apparatus. Thus, the mark images MG1, MG2 can be displayed together on the monitor 3 of the opponent game apparatus. Further, since the opponent side displays the batting position designated by the own side by exchanging the pieces of information with the own side after the pitching position is determined, the pitching position is designated while predicting or assessing the opponent's strategy, wherefore a high game element can be maintained.

FIG. 19 is a flow chart showing the procedure of an at-bat flow included in the sequence execution processing shown in Step S45 of FIG. 16. First of all, a case where the game player is at the batter side is described. Since a case where the game player is at the pitcher side is basically the same, only parts of the procedure different from the procedure in the case of the batter are described.

First of all, data on the pitching and batting processings (works) performed in the sequence immediately before are initialized (Step S111) and the selection results by the game player on the "sign" items and the like are received (Step S113). The game player inputs to be received include the position data of the player cards 9 on the placing surfaces 20.

Subsequently, batting data as data to be transmitted to the opponent game apparatus is generated (Step S115). This data is transmitted to the opponent game apparatus (Step S117) and pitching data transmitted from the opponent game apparatus is received (Step S119). These transmission and reception are set upon the elapse of a specified time after the start of the batting flow, whereby the both game apparatuses can simultaneously transmit to and receive from each other. The transmission and reception may be in such a mode that reception is enabled as an interrupt at both sides and data is transmitted to the other game apparatus immediately after being generated. By exchanging the data with each other in this way, the respective game apparatuses come to possess the identical pitching data and batting data. In addition, by the both sides possessing the same data, there is no time delay between the image displays of the both game apparatuses and a game environment giving no sense of discomfort and nearly equal in terms of communication can be provided.

Subsequently, the received pitching data is saved in the work area of the RAM 3002 (Step S121) and a hitting judgment is made by the battle result setting section 307 using the pitching data and the batting data (Step S123). In this hitting judgment, a processing for a normal mode (including the case of selecting only the command item) is performed.

In Step S125, a ball trajectory calculation is performed using the pitching data and, then, a "batting point", which is a passage position above the home base obtained by this ball trajectory calculation is set (saved) in the work area (Step S127). Subsequently, a "pitching" image as a pitching motion and a pitching processing is displayed on the monitor 3 in accordance with the result of the ball trajectory calculation (Step S129) and, then, a "batting" image as a batting motion and a batting processing is displayed on the monitor 3 in accordance with a swing timing, a hitting direction and a hitting speed as a battle result obtained by calculation (Step S131). Subsequently, upon receiving the battle result, the motions of the fielder characters, the runner character(s) and the ball character are successively calculated and these characters are displayed as images on the monitor 3 (Step S133).

If the game player is at the pitcher side, processings in Steps #111 to #133 are performed while being timed with the respective processings in Steps S111 to S133. The pitching data is transmitted in Step #117 and the batting data is received in Step #119.

Although the game system is built to change and adjust the game element by using the player cards 9 and displacing the placed positions thereof in the above embodiment, the present invention is not limited to this. For example, the game system may be in such a mode as to build teams by the designation of members or selectable members of teams stored beforehand in the game apparatuses as player characters or to build a team by player characters brought up through a growth game or the like by the own game player.

In the above embodiment, the operation unit may employ a pointing device such a so-called mouse or joystick instead of the touch panel 109.

Although the game system is a simple one in which one sequence is executed by one pitch of the pitcher in the above embodiment, it may be constructed to execute the game in accordance with the baseball rules or to execute one sequence by two pitches.

In the above embodiment, the shapes of the mark images are not limited to circular shapes and may be polygonal shapes such as rectangular shapes, possibly, with ability data reflected on the respective vertices. The shapes of the mark images may also be elliptical shapes instead of circular shapes. Further, the mark images may be in the form of single circles set based on the player parameters.

Although the sizes of the mark images are set in consideration of the sizes obtained from the player parameters and the magnification rates obtained from the pitch sequence histories and the designated positions in the above embodiment, they may be directly set from the pitch sequence histories and the designated positions without considering the sizes obtained from the player parameters. In this case, a basic size may be specified beforehand for each mark image and a final size may be determined in consideration of the pitch sequence history and the designated position or a final size may be calculated or set in accordance with a specified rule from the pitch sequence history and the designated position.

In this specification, various modes of technologies are disclosed as described above and main ones thereof are summarized as follows.

A game apparatus according to one mode is the one communicably connected with another game apparatus operable by an opponent game player, causing an image display controlling section to display a pitching position designation area and a batting position designation area of the same shapes and two characters simulating a pitcher and a batter battling with each other at specified positions of a screen of a display device, causing the two characters to battle by a pitching motion by a pitching character and a batting motion by a batter character at positions designated by a game player and the opponent game player and controlling the progress of a game simulating a baseball game in accordance with a battle result, the game apparatus comprising a pitch sequence history generating section for generating a virtual pitch sequence history of at least a plurality of pitches in each at-bat; a pitching position designating section for designating a pitching position at a suitable position in the pitching position designation area during the display of the pitch sequence history on the display device by the image display controlling section; a batting position designating section for designating a batting position at a suitable position in the batting position designation area during the display of the pitch sequence history on the display device by the image display controlling section; a pitching width size setting section for determining a mark size as an indicator of difficulty to hit based on a positional relationship of the designated pitching position and areas with many pitching records and displaying a pitching mark centered on the designated position in the determined mark size; a batting width size setting section for determining a batting mark whose size as an indicator of easiness to hit is increased as the designated batting position is closer to the area with many pitching records and displaying a batting mark centered on the designated position in the determined mark size; a designation result display controlling section for displaying the pitching mark and the batting mark on the display device after the designation of the positions of the both marks set by the game player and the opponent game player via the other game apparatus; and a battle result determining section for obtaining a pitching/batting result according to an overlapping degree of the pitching mark and the batting mark.

A game control program according to another mode is for controlling a game apparatus communicably connected with another game apparatus operable by an opponent game player, causing an image display controlling section to display a pitching position designation area and a batting position designation area of the same shapes and two characters simulating a pitcher and a batter battling with each other on a display device, and simulating a baseball game in which the result of a battle by one pitching motion and one batting motion at positions designated by a game player and the opponent game player is obtained by a computer, the computer being caused to function as a pitch sequence history generating section for generating a virtual pitch sequence history of at least a plurality of pitches in each at-bat; a pitching position designating section for designating a pitching position at a suitable position in the pitching position designation area during the display of the pitch sequence history on the display device by the image display controlling section; a batting position designating section for designating a batting position at a suitable position in the batting position designation area during the display of the pitch sequence history on the display device by the image display controlling section; a pitching width size setting section for determining a mark size as an indicator of difficulty to hit based on a positional relationship of the designated pitching position and areas with many pitching records and displaying a pitching mark centered on the designated position in the determined mark size; a batting width size setting section for determining a batting mark whose size as an indicator of easiness to hit is increased as the designated batting position is closer to the area with many pitching records and displaying a batting mark centered on the designated position in the determined mark size; a designation result display controlling section for displaying the pitching mark and the batting mark on the display device after the designation of the positions of the both marks set by the game player and the opponent game player via the other game apparatus; and a battle result determining section for obtaining a pitching/batting result according to an overlapping degree of the pitching mark and the batting mark.

A game control method according to another mode is for controlling a game apparatus communicably connected with another game apparatus operable by an opponent game player, causing an image display controlling section to display a pitching position designation area and a batting position designation area of the same shapes and two characters simulating a pitcher and a batter battling with each other on a display device, and simulating a baseball game in which the result of a battle is obtained by one pitching motion and one batting motion at positions designated by a game player and the opponent game player, wherein a pitch sequence history generating section generates a virtual pitch sequence history of at least a plurality of pitches in each at-bat; a pitching position designating section designates a pitching position at a suitable position in the pitching position designation area during the display of the pitch sequence history on the display device by the image display controlling section; a pitching width size setting section determines a mark size as an indicator of difficulty to hit based on a positional relationship of the designated pitching position and areas with many pitching records and displays a pitching mark centered on the designated position in the determined mark size; a batting width size setting section determines a batting mark whose size as an indicator of easiness to hit is increased as the batting position designated via the other game apparatus is closer to the area with many pitching records and displays a batting mark centered on the designated position in the determined mark size; a designation result display controlling section displays the batting mark set by the two competing game player on the display device at least after the designation of the pitching mark; and a battle result determining section obtains a pitching/batting result according to an overlapping degree of the pitching mark and the batting mark.

A game control method according to another mode is for controlling a game apparatus communicably connected with another game apparatus operable by an opponent game player, causing an image display controlling section to display a pitching position designation area and a batting position designation area of the same shapes and two characters simulating a pitcher and a batter battling with each other on a display device, and simulating a baseball game in which the result of a battle is obtained by one pitching motion and one batting motion at positions designated by a game player and the opponent game player, wherein a pitch sequence history generating section generates a virtual pitch sequence history of at least a plurality of pitches in each at-bat; a batting position designating section designates a batting position at a suitable position in the batting position designation area during the display of the pitch sequence history on the display device by the image display controlling section; a batting width size setting section determines a batting mark whose size as an indicator of easiness to hit is increased as the designated batting position is closer to the area with many pitching records and displays a batting mark centered on the designated position in the determined mark size; a pitching width size setting section determines a mark size as an indicator of difficulty to hit based on a positional relationship of the pitching position designated via the other game apparatus and areas with many pitching records and displays a pitching mark centered on the designated position in the determined mark size; a designation result display controlling section displays the pitching mark set by the competing game players on the display device at least after the designation of the batting position; and a battle result determining section obtains a pitching/batting result according to an overlapping degree of the pitching mark and the batting mark.

In the game apparatus, the game control methods and the game control program thus constructed, a virtual pitch sequence history is presented and the sizes of the pitching mark and the batting mark of a pitcher side and a batter side are changed in relation to this pitch sequence history upon designating the pitching position and the batting position in the case of proceeding with the baseball game without performing all the pitches in one at-bat. Since the sizes of the pitching mark and the batting mark are changed according to the pitch sequence history, it is possible to provide a more interesting game with more importance attached to the strategic characteristics of the game.

A game apparatus according to another mode is the one communicably connected with another game apparatus operable by an opponent game player, causing an image display controlling section to display a pitching position designation area and a batting position designation area of the same shapes and two characters simulating a pitcher and a batter battling with each other at specified positions of a screen of a display device, causing the two characters to battle by a pitching motion by a pitching character and a batting motion by a batter character at positions designated by a game player and the opponent game player and controlling the progress of a game simulating a baseball game in accordance with a battle result, the game apparatus comprising a pitch sequence history generating section for generating a virtual pitch sequence history of at least a plurality of pitches in each at-bat; a pitching position designating section for designating a pitching position at a suitable position in the pitching position designation area during the display of the pitch sequence history on the display device by the image display controlling section; a batting position designating section for designating a batting position at a suitable position in the batting position designation area during the display of the pitch sequence history on the display device by the image display controlling section; a pitching width size setting section for determining a pitching mark whose size as an indicator of difficulty to hit is decreased as the designated pitching position is closer to the area with many pitching records and displaying a pitching mark centered on the designated position in the determined mark size; a batting width size setting section for determining a batting mark whose size as an indicator of easiness to hit is increased as the designated batting position is closer to the area with many pitching records and displaying a batting mark centered on the designated position in the determined mark size; a designation result display controlling section for displaying the pitching mark and the batting mark on the display device after the designation of the positions of the both marks set by the game player and the opponent game player via the other game apparatus; and a battle result determining section for obtaining a pitching/batting result according to an overlapping degree of the pitching mark and the batting mark.

A game control program according to another mode is for controlling a game apparatus communicably connected with another game apparatus operable by an opponent game player, causing an image display controlling section to display a pitching position designation area and a batting position designation area of the same shapes and two characters simulating a pitcher and a batter battling with each other on a display device, and simulating a baseball game in which the result of a battle by one pitching motion and one batting motion at positions designated by a game player and the opponent game player is obtained by a computer, the computer being caused to function as a pitch sequence history generating section for generating a virtual pitch sequence history of at least a plurality of pitches in each at-bat; a pitching position designating section for designating a pitching position at a suitable position in the pitching position designation area during the display of the pitch sequence history on the display device by the image display controlling section; a batting position designating section for designating a batting position at a suitable position in the batting position designation area during the display of the pitch sequence history on the display device by the image display controlling section; a pitching width size setting section for determining a pitching mark whose size as an indicator of difficulty to hit is decreased as the designated pitching position is closer to the area with many pitching records and displaying a pitching mark centered on the designated position in the determined mark size; a batting width size setting section for determining a batting mark whose size as an indicator of easiness to hit is increased as the designated batting position is closer to the area with many pitching records and displaying a batting mark centered on the designated position in the determined mark size; a designation result display controlling section for displaying the pitching mark and the batting mark on the display device after the designation of the positions of the both marks set by the game player and the opponent game player via the other game apparatus; and a battle result determining section for obtaining a pitching/batting result according to an overlapping degree of the pitching mark and the batting mark.

A game control method according to another mode is for controlling a game apparatus communicably connected with another game apparatus operable by an opponent game player, causing an image display controlling section to display a pitching position designation area and a batting position designation area of the same shapes and two characters simulating a pitcher and a batter battling with each other on a display device, and simulating a baseball game in which the result of a battle is obtained by one pitching motion and one batting motion at positions designated by a game player and the opponent game player, wherein a pitch sequence history generating section generates a virtual pitch sequence history of at least a plurality of pitches in each at-bat; a pitching position designating section designates a pitching position at a suitable position in the pitching position designation area during the display of the pitch sequence history on the display device by the image display controlling section; a pitching width size setting section determines a pitching mark whose size as an indicator of difficulty to hit is decreased as the designated pitching position is closer to the area with many pitching records and displays a pitching mark centered on the designated position in the determined mark size; a batting width size setting section determines a batting mark whose size as an indicator of easiness to hit is increased as the batting position designated via the other game apparatus is closer to the area with many pitching records and displays a batting mark centered on the designated position in the determined mark size; a designation result display controlling section displays the batting mark set by the respective competing game players on the display device at least after the designation of the pitching position; and a battle result determining section obtains a pitching/batting result according to an overlapping degree of the pitching mark and the batting mark.

A game control method according to another mode is for controlling a game apparatus communicably connected with another game apparatus operable by an opponent game player, causing an image display controlling section to display a pitching position designation area and a batting position designation area of the same shapes and two characters simulating a pitcher and a batter battling with each other on a display device, and simulating a baseball game in which the result of a battle is obtained by one pitching motion and one batting motion at positions designated by a game player and the opponent game player, wherein a pitch sequence history generating section generates a virtual pitch sequence history of at least a plurality of pitches in each at-bat; a batting position designating section designates a batting position at a suitable position in the batting position designation area during the display of the pitch sequence history on the display device by the image display controlling section; a batting width size setting section determines a batting mark whose size as an indicator of easiness to hit is increased as the designated batting position is closer to the area with many pitching records and displays the batting mark centered on the designated position in the determined mark size; a pitching width size setting section determines a pitching mark whose size as an indicator of difficulty to hit is decreased as the pitching position designated via the other game apparatus is closer to the area with many pitching records and displays a batting mark centered on the designated position in the determined mark size; a designation result display controlling section displays the pitching mark set by the respective competing game players on the display device at least after the designation of the batting position; and a battle result determining section obtains a pitching/batting result according to an overlapping degree of the batting mark and the pitching mark.

In the game apparatus, the game control methods and the game control program thus constructed, the own game apparatus is communicably connected with the other game apparatus operable by the opponent game player. In the game apparatus, the pitching position designation area and the batting position designation area of the same shapes and the two characters simulating the pitcher and the batter battling with each other are displayed at the specified positions of the screen of the display device by the image display controlling section, the pitcher character and the batter character battle by the pitching motion of the pitcher character and the batting motion of the batter character at the respective positions designated by the game apparatus of the game player and that of the opponent game player, and the progress of the game simulating a baseball game is controlled in accordance with the battle result.

When the pitch sequence history generating section generates the virtual pitch sequence history of at least a plurality of pitches in each at-bat and the pitching position designating section designates the pitching position at a suitable position in the pitching position designation area during the display of the pitch sequence history on the display device by the image display controlling section, the pitching width size setting section determines the pitching mark whose size as an indicator of difficulty to hit is decreased as the designated pitching position is closer to the area with many pitching records and displays the pitching mark centered on the designated position in the determined mark size, the batting width size setting section determines the batting mark whose size as an indicator of easiness to hit is increased as the batting position designated via the other game apparatus is closer to the area with many pitching records and displays the batting mark centered on the designated position in the determined mark size, the designation result display controlling section displays the batting mark set by the competing game players on the display device at least after the designation of the pitching position, and the battle result determining section obtains the pitching/batting result according to the overlapping degree of the batting mark and the pitching mark.

Further, when the pitch sequence history generating section generates the virtual pitch sequence history of at least a plurality of pitches in each at-bat and the batting position designating section designates the batting position at a suitable position in the batting position designation area during the display of the pitch sequence history on the display device by the image display controlling section, the batting width size setting section determines the batting mark whose size as an indicator of easiness to hit is increased as the designated batting position is closer to the area with many pitching records and displays the batting mark centered on the designated position in the determined mark size, the pitching width size setting section determines the pitching mark whose size as an indicator of difficulty to hit is decreased as the pitching position designated via the other game apparatus is closer to the area with many pitching records and displays the pitching mark centered on the designated position in the determined mark size, the designation result display controlling section displays the pitching mark set by the competing game players on the display device at least after the designation of the batting position, and the battle result determining section obtains the pitching/batting result according to the overlapping degree of the batting mark and the pitching mark.

Accordingly, the pitching mark whose size as an indicator of difficulty to hit is changed to decrease based on the pitch sequence history and the designated pitching position as the designated position is closer to the area with many pitching records and the batting mark whose size as an indicator of easiness to hit is changed to increase based on the pitch sequence history and the designated batting position as the designated position is closer to the area with many pitching records. Thus, the game player at the pitcher side can take such a strategy as to make it difficult to hit by decreasing the size of the pitching mark or to designate another position (area with no or less pitching experiences thus far) to outsmart the opponent even by increasing the mark size. On the other hand, the game player at the batter side can take such a strategy as to make it easy to hit by increasing the size of the batting mark or to designate another position (area with no or less pitching experiences thus far) to outsmart the opponent even by decreasing the mark size, i.e. to designate a position closer to the one set when the game player at the pitcher side tries to outsmart the game player at the batter side. Since the sizes of the pitching mark and the batting mark are changed according to the pitch sequence history in this way, more importance is attached to the strategic characteristic of the game and a more integrating game can be provided.

In another mode, in the above game apparatus, the pitching width size setting section preferably determines a smaller pitching mark for the designated pitching position close to a lower pitching position in a virtual pitch order of the pitch sequence history. According to this construction, the size of the pitching mark is so set, considering also the pitch sequence history, as to determine a smaller pitching mark for the designated pitching position close to the lower pitching position in the virtual pitch order of the pitch sequence history, wherefore more importance is attached to the strategic characteristic of the game and a more integrating game can be provided.

In another mode, in the above game apparatuses, the batting width size setting section preferably determines a larger batting mark for the designated batting position close to a lower batting position in a virtual pitch order of the pitch sequence history. According to this construction, the size of the batting mark is so set, considering also the pitch sequence history, as to determine a larger batting mark for the designated batting position close to the lower batting position in the virtual pitch order of the pitch sequence history, wherefore more importance is attached to the strategic characteristic of the game and a more integrating game can be provided.

In another mode, in the above game apparatuses, the pitch sequence history generating section preferably generates the pitch sequence history at least up to the second strike. According to this construction, since the pitch sequence history is generated at least up to the second strike, the battle in one at-bat can be made by considering not all the pitches made, but the remaining one or a specified number of pitches less than all the pitches in the baseball game, wherefore the game can more efficiently proceed.

In another mode, in the above game apparatuses, the pitch sequence history generating section preferably includes a pitch sequence history storage for storing a plurality of types of pitch sequence histories and selects one pitch sequence history for each at-bat. According to this construction, the plurality of types of pitch sequence histories are stored in the pitch sequence history storage beforehand and one of them is selected for each at-bat, wherefore a different pitch sequence history can be selected for each at-bat.

In another mode, in the above game apparatus, the pitch sequence history storage preferably includes pitch sequence histories advantageous to the pitcher side and those disadvantageous to the pitcher side. According to this construction, more importance is attached to the strategic characteristic of the game and a more interesting game is provided since the pitch sequence histories include the pitch sequence histories advantageous to the pitcher side and those disadvantageous to the pitcher side.

In another mode, in the above game apparatus, it is preferable that a pitcher evaluation value calculating section for calculating a pitcher evaluation value, which increases and decreases according to a game status, for the pitcher character is provided; and that the pitch sequence history generating section selects the pitch sequence history more advantageous to the pitcher side as the current pitcher evaluation value of the pitcher character increases. According to this construction, the pitcher evaluation value such as a physical strength value influential to pitching abilities of the pitcher character increases and decreases according to the game status, and the higher the pitcher evaluation value, the more advantageous the selected pitch sequence history is to the pitcher side. Therefore, more importance is attached to the strategic characteristic of the game and a more interesting game is provided.

In another mode, in the above game apparatuses, it is preferable that the pitching position designation area is divided into a plurality of square sections; and that the image display controlling section displays the square sections of the pitching position designation areas advantageous to the pitcher side and those disadvantageous to the pitcher side in different modes. According to this construction, the respective square sections of the pitching position designation area are displayed in different modes, for example, displayed in different colors depending on whether they are advantageous or disadvantageous to the pitcher side. This can be taken into account for the strategy in designating the pitching position by the game player, wherefore more importance is attached to the strategic characteristic of the game and a more interesting game is provided.

In another mode, in the above game apparatuses, it is preferable that the batting position designation area is divided into a plurality of square sections; and that the image display controlling section displays the square sections of the batting position designation areas advantageous to the batter side and those disadvantageous to the batter side in different modes. According to this construction, the respective square sections of the batting position designation area are displayed in different modes, for example, displayed in different colors depending on whether they are advantageous or disadvantageous to the batter side (i.e. disadvantageous or advantageous to the pitcher side). This can be taken into account for the strategy in designating the batting position by the game player, wherefore more importance is attached to the strategic characteristic of the game and a more interesting game is provided.

In another mode, in the above game apparatuses, the designation result display controlling section preferably displays the pitching position designation area and the batting position designation in a superimposed manner. According to this construction, the overlapping degree can be plainly recognized.

A game apparatus according to another mode is the one communicably connected with another game apparatus operable by an opponent game player, causing an image display controlling section to display a pitching position designation area and a batting position designation area of the same shapes and two characters simulating a pitcher and a batter battling with each other at specified positions of a screen of a display device, causing the two characters to battle by a pitching motion by a pitching character and a batting motion by a batter character at positions designated by a game player and the opponent game player and controlling the progress of a game simulating a baseball game in accordance with a battle result, the game apparatus comprising a pitch sequence history generating section for generating a virtual pitch sequence history of at least a plurality of pitches in each at-bat; a pitching position designating section for designating a pitching position at a suitable position in the pitching position designation area during the display of the pitch sequence history on the display device by the image display controlling section; a batting position designating section for designating a batting position at a suitable position in the batting position designation area during the display of the pitch sequence history on the display device by the image display controlling section; a pitching width size setting section for determining a pitching mark whose size as an indicator of difficulty to hit is increased as the designated pitching position is closer to the area with many pitching records and displaying the pitching mark centered on the designated position in the determined mark size; a batting width size setting section for determining a batting mark whose size as an indicator of easiness to hit is increased as the designated batting position is closer to the area with many pitching records and displaying a batting mark centered on the designated position in the determined mark size; a designation result display controlling section for displaying the pitching mark and the batting mark on the display device after the designation of the positions of the both marks set by the game player and the opponent game player via the other game apparatus; and a battle result determining section for obtaining a pitching/batting result according to an overlapping degree of the pitching mark and the batting mark.

A game control program according to another mode is for controlling a game apparatus communicably connected with another game apparatus operable by an opponent game player, causing an image display controlling section to display a pitching position designation area and a batting position designation area of the same shapes and two characters simulating a pitcher and a batter battling with each other on a display device, and simulating a baseball game in which the result of a battle by one pitching motion and one batting motion at positions designated by a game player and the opponent game player is obtained by a computer, the computer being caused to function as a pitch sequence history generating section for generating a virtual pitch sequence history of at least a plurality of pitches in each at-bat; a pitching position designating section for designating a pitching position at a suitable position in the pitching position designation area during the display of the pitch sequence history on the display device by the image display controlling section; a batting position designating section for designating a batting position at a suitable position in the batting position designation area during the display of the pitch sequence history on the display device by the image display controlling section; a pitching width size setting section for determining a pitching mark whose size as an indicator of difficulty to hit is increased as the designated pitching position is closer to the area with many pitching records and displaying a pitching mark centered on the designated position in the determined mark size; a batting width size setting section for determining a batting mark whose size as an indicator of easiness to hit is increased as the designated batting position is closer to the area with many pitching records and displaying a batting mark centered on the designated position in the determined mark size; a designation result display controlling section for displaying the pitching mark and the batting mark on the display device after the designation of the positions of the both marks set by the game player and the opponent game player via the other game apparatus; and a battle result determining section for obtaining a pitching/batting result according to an overlapping degree of the pitching mark and the batting mark.

A game control method according to another mode is for controlling a game apparatus communicably connected with another game apparatus operable by an opponent game player, causing an image display controlling section to display a pitching position designation area and a batting position designation area of the same shapes and two characters simulating a pitcher and a batter battling with each other on a display device, and simulating a baseball game in which the result of a battle is obtained by one pitching motion and one batting motion at positions designated by a game player and the opponent game player, wherein a pitch sequence history generating section generates a virtual pitch sequence history of at least a plurality of pitches in each at-bat; a pitching position designating section designates a pitching position at a suitable position in the pitching position designation area during the display of the pitch sequence history on the display device by the image display controlling section; a pitching width size setting section determines a pitching mark whose size as an indicator of difficulty to hit is increased as the designated pitching position is closer to the area with many pitching records and displays a pitching mark centered on the designated position in the determined mark size; a batting width size setting section determines a batting mark whose size as an indicator of easiness to hit is increased as the batting position designated via the other game apparatus is closer to the area with many pitching records and displays a batting mark centered on the designated position in the determined mark size; a designation result display controlling section displays the batting mark set by the respective competing game players on the display device at least after the designation of the pitching position; and a battle result determining section obtains a pitching/batting result according to an overlapping degree of the pitching mark and the batting mark.

A game control method according to another mode is for controlling a game apparatus communicably connected with another game apparatus operable by an opponent game player, causing an image display controlling section to display a pitching position designation area and a batting position designation area of the same shapes and two characters simulating a pitcher and a batter battling with each other on a display device, and simulating a baseball game in which the result of a battle is obtained by one pitching motion and one batting motion at positions designated by a game player and the opponent game player, wherein a pitch sequence history generating section generates a virtual pitch sequence history of at least a plurality of pitches in each at-bat; a batting position designating section designates a batting position at a suitable position in the batting position designation area during the display of the pitch sequence history on the display device by the image display controlling section; a batting width size setting section determines a batting mark whose size as an indicator of easiness to hit is increased as the designated batting position is closer to the area with many pitching records and displays a batting mark centered on the designated position in the determined mark size; a pitching width size setting section determines a pitching mark whose size as an indicator of difficulty to hit is increased as the pitching position designated via the other game apparatus is closer to the area with many pitching records and displays a pitching mark centered on the designated position in the determined mark size; a designation result display controlling section displays the pitching mark set by the respective competing game players on the display device at least after the designation of the batting position; and a battle result determining section obtains a batting/batting result according to an overlapping degree of the batting mark and the batting mark.

In the game apparatus, the game control program and the game control methods thus constructed, the own game apparatus is communicably connected with the other game apparatus operable by the opponent game player. In the game apparatus, the pitching position designation area and the batting position designation area of the same shapes and the two characters simulating the pitcher and the batter battling with each other are displayed at the specified positions of the screen of the display device by the image display controlling section, the pitcher character and the batter character battle by the pitching motion of the pitcher character and the batting motion of the batter character at the respective positions designated by the game apparatus of the game player and that of the opponent game player, and the progress of the game simulating a baseball game is controlled in accordance with the battle result.

When the pitch sequence history generating section generates the virtual pitch sequence history of at least a plurality of pitches in each at-bat and the pitching position designating section designates the pitching position at a suitable position in the pitching position designation area during the display of the pitch sequence history on the display device by the image display controlling section, the pitching width size setting section determines the pitching mark whose size as an indicator of difficulty to hit is increased as the designated pitching position is closer to the area with many pitching records and displays the pitching mark centered on the designated position in the determined mark size, the batting width size setting section determines the batting mark whose size as an indicator of easiness to hit is increased as the batting position designated via the other game apparatus is closer to the area with many pitching records and displays the batting mark centered on the designated position in the determined mark size, the designation result display controlling section displays the batting mark set by the competing game players on the display device at least after the designation of the pitching position, and the battle result determining section obtains the pitching/batting result according to the overlapping degree of the batting mark and the pitching mark.

Further, when the pitch sequence history generating section generates the virtual pitch sequence history of at least a plurality of pitches in each at-bat and the batting position designating section designates the batting position at a suitable position in the batting position designation area during the display of the pitch sequence history on the display device by the image display controlling section, the batting width size setting section determines the batting mark whose size as an indicator of easiness to hit is increased as the designated batting position is closer to the area with many pitching records and displays the batting mark centered on the designated position in the determined mark size, the pitching width size setting section determines the pitching mark whose size as an indicator of difficulty to hit is increased as the pitching position designated via the other game apparatus is closer to the area with many pitching records and displays the pitching mark centered on the designated position in the determined mark size, the designation result display controlling section displays the pitching mark set by the competing game players on the display device at least after the designation of the batting position, and the battle result determining section obtains the pitching/batting result according to the overlapping degree of the batting mark and the pitching mark.

Accordingly, the pitching mark whose size as an indicator of difficulty to hit is changed to increase based on the pitch sequence history and the designated pitching position as the designated pitching position is closer to the area with many pitching records and the batting mark whose size as an indicator of easiness to hit is changed to increase based on the pitch sequence history and the designated batting position as the designated batting position is closer to the area with many pitching records. Thus, the game player at the pitcher side can take such a strategy as to make it difficult to hit by designating a position distant from the area with many pitching records (i.e. a position in an area with no or less pitching records) or to persistently designate a position close to the area with many pitching records to outsmart the opponent even if the mark size is large. On the other hand, the game player at the batter side can take such a strategy as to make it easier to hit by designating a position close to the area with many pitching records to increase the size of the batting mark or to designate another position (area with no or less pitching experiences thus far), i.e. a position which would be set when the game player at the pitcher side tries to outsmart the game player at the batter side even if the mark size is small. Since the sizes of the pitching mark and the batting mark are changed according to the pitch sequence history in this way, more importance is attached to the strategic characteristic of the game and a more integrating game can be provided.

In another mode, in the above game apparatus, the pitching width size setting section preferably determines a larger pitching mark for the designated pitching position close to a lower pitching position in a virtual pitch order of the pitch sequence history. According to this construction, the size of the pitching mark is so set, considering also the pitch sequence history, as to determine a larger pitching mark for the designated pitching position close to the lower pitching position in the virtual pitch order of the pitch sequence history, wherefore more importance is attached to the strategic characteristic of the game and a more integrating game can be provided.

In another mode, in the above game apparatuses, the batting width size setting section preferably determines a larger batting mark for the designated batting position close to a lower batting position in a virtual pitch order of the pitch sequence history. According to this construction, the size of the batting mark is so set, considering also the pitch sequence history, as to determine a larger batting mark for the designated batting position close to the lower batting position in the virtual pitch order of the pitch sequence history, wherefore more importance is attached to the strategic characteristic of the game and a more integrating game can be provided.

In another mode, in the above game apparatuses, the pitch sequence history generating section preferably generates the pitch sequence history at least up to the second strike. According to this construction, since the pitch sequence history is generated at least up to the second strike, the battle in one at-bat can be made by considering not all the pitches made, but the remaining one pitch or a specified number of pitches less than all the pitches in the baseball game, wherefore the game can more efficiently proceed.

In another mode, in the above game apparatuses, the pitch sequence history generating section preferably includes a pitch sequence history storage for storing a plurality of types of pitch sequence histories and selects one pitch sequence history for each at-bat. According to this construction, the plurality of types of pitch sequence histories are stored in the pitch sequence history storage beforehand and one of them is selected for each at-bat, wherefore a different pitch sequence history can be selected for each at-bat.

In another mode, in the above game apparatus, the pitch sequence history storage preferably includes pitch sequence histories advantageous to the pitcher side and those disadvantageous to the pitcher side. According to this construction, more importance is attached to the strategic characteristic of the game and a more interesting game is provided since the pitch sequence histories include the pitch sequence histories advantageous to the pitcher side and those disadvantageous to the pitcher side.

In another mode, in the above game apparatus, it is preferable that a pitcher evaluation value calculating section for calculating a pitcher evaluation value, which increases and decreases according to a game status, for the pitcher character is provided; and that the pitch sequence history generating section selects the pitch sequence history more advantageous to the pitcher side as the current pitcher evaluation value of the pitcher character increases. According to this construction, the pitcher evaluation value such as a physical strength value influential to pitching abilities of the pitcher character increases and decreases according to the game status, and the higher the pitcher evaluation value, the more advantageous the selected pitch sequence history is to the pitcher side. Therefore, more importance is attached to the strategic characteristic of the game and a more interesting game is provided.

In another mode, in the above game apparatuses, it is preferable that the pitching position designation area is divided into a plurality of square sections; and that the image display controlling section displays the square sections of the pitching position designation areas advantageous to the pitcher side and those disadvantageous to the pitcher side in different modes. According to this construction, the respective square sections of the pitching position designation area are displayed in different modes, for example, displayed in different colors depending on whether they are advantageous or disadvantageous to the pitcher side. This can be taken into account for the strategy in designating the pitching position by the game player, wherefore more importance is attached to the strategic characteristic of the game and a more interesting game is provided.

In another mode, in the above game apparatuses, it is preferable that the batting position designation area is divided into a plurality of square sections; and that the image display controlling section displays the square sections of the batting position designation areas advantageous to the batter side and those disadvantageous to the batter side in different modes. According to this construction, the respective square sections of the batting position designation area are displayed in different modes, for example, displayed in different colors depending on whether they are advantageous or disadvantageous to the batter side (i.e. disadvantageous or advantageous to the pitcher side). This can be taken into account for the strategy in designating the batting position by the game player, wherefore more importance is attached to the strategic characteristic of the game and a more interesting game is provided.

In another mode, in the above game apparatuses, the designation result display controlling section preferably displays the pitching position designation area and the batting position designation in a superimposed manner. According to this construction, the overlapping degree can be plainly recognized.

This application is based on Japanese Patent Applications Nos. 2007-203454 and 2007-203455 filed on Aug. 3, 2007, the contents of which are hereby incorporated by reference.

The present invention has been appropriately and sufficiently described above by way of the embodiment with reference to the drawings, but it should be appreciated that a person skilled in the art can easily modify and/or improve the above embodiment. Accordingly, a modified embodiment or improved embodiment carried out by the person skilled in the art should be interpreted to be embraced by the scope as claimed unless departing from the scope as claimed.

What is claimed is:

1. A game apparatus operated by a first game player communicably connected with another game apparatus of same construction operable by an opponent game player, the communicably connected game apparatus comprising:
   a display device for displaying a game simulating a baseball game;
   an image display controlling section that controls display of a pitching position designation area, a batting position designation area, and a pitcher character and a batter character simulating, respectively, a pitcher and a batter battling with each other at specified positions of a screen of the display device, that controls display of pitching motion of the pitcher character, a batting motion of the batter character, and that controls progress of the game in accordance with a battle result;
   a pitch sequence history generating section for generating a pitch sequence history including previous pitching positions having been made in a specified at-bat before a next pitch occurs in the specified at-bat;
   a pitching mark image size setting section for determining a size of a pitching mark image serving as an indicator of the hitting difficulty based on a positional relationship between a subsequent pitching position and the previous pitching positions of the pitch sequence history, wherein a smaller size of the pitching mark image indicates greater difficulty in hitting a pitch, and wherein the pitching mark image is displayed on the display device for designating a subsequent pitching position by the pitcher character as manipulated by the game player of said communicably connected game apparatus;
   a batting mark image size setting section for determining a size of a batting mark image as an indicator of the hitting easiness based on a positional relationship between a subsequent batting position and the previous pitching positions of the pitch sequence history, wherein a larger size of the batting mark image indicates reduced hitting difficulty, and wherein the batting mark image is displayed on the display device for designation of the subsequent batting position in the case of the batter character being manipulated by the first game player;
   a pitching position designating section for allowing the first game player to designate the subsequent pitching position at a desired position in the pitching position designation area while moving the displayed pitching mark image, wherein the displayed pitching mark image size changes in accordance with the positional relationship to the previous pitching position, in the case of the pitcher character being manipulated by the first game player;
   a batting position designating section for allowing the first game player to designate the subsequent batting position at a desired position in the batting position designation area while moving the displayed batting mark image whose size changes in accordance with the positional relationship to the previous pitching position, in the case of the batter character being manipulated by the first game player; and
   a battle result determining section for obtaining a result of the battle according to a determined overlapping degree of the pitching mark image designating the subsequent pitching position and the batting mark image designating the subsequent batting position.

2. A game apparatus according to claim 1, wherein the size of the pitching mark images becomes smaller as the subsequent pitching position to be designated is moved closer to a pitching area having most previous pitching positions.

3. A game apparatus according to claim 2, wherein the size of the pitching mark image becomes smaller as the subsequent pitching position to be designated is moved closer to a previous pitching position in a lower pitch order of the pitch sequence history.

4. A game apparatus according to claim 2, wherein the size of the batting mark image becomes larger as the subsequent batting position to be designated is moved closer to a previous batting position in a lower pitch order of the pitch sequence history.

5. A game apparatus according to claim 2, wherein the pitch sequence history generating section includes a pitch sequence history storage for storing a plurality of predetermined pitch sequence histories, and selects one of the plurality of predetermined pitch sequence histories before the game is started.

6. A game apparatus according to claim 5, wherein the plurality of predetermined pitch sequence histories includes a predetermined pitch sequence history having at least up to a second strike.

7. A game apparatus according to claim 5, wherein the plurality of predetermined pitch sequence histories include pitch sequence histories advantageous to the pitcher side and those disadvantageous to the pitcher side.

8. A game apparatus according to claim 7, further comprising a pitcher evaluation value calculating section for calculating a pitcher evaluation value for the pitcher character, the pitcher evaluation value being changeable according to a game status, wherein the pitch sequence history generating section selects a predetermined pitch sequence history more advantageous to the pitcher side as the current pitcher evaluation value of the pitcher character increases.

9. A game apparatus according to claim 2, wherein:
the pitching position designation area is divided into a plurality of square sections; and
the image display controlling section displays square sections advantageous to the pitcher side and those disadvantageous to the pitcher side in different modes.

10. A game apparatus according to claim 2, wherein:
the batting position designation area is divided into a plurality of square sections; and
the image display controlling section displays square sections advantageous to the batter side and those disadvantageous to the batter side in different modes.

11. A game apparatus according to claim 2, wherein the image display controlling section displays the pitching position designation area and the batting position designation in a superimposed manner.

12. A game apparatus according to claim 1, wherein the size of the pitching mark image becomes larger as the subsequent pitching position to be designated is moved closer to a pitching area having most previous pitching positions.

13. A game apparatus according to claim 12, wherein the size of the pitching mark image becomes larger as the subsequent pitching position to be designated is moved closer to a previous pitching position in a lower pitch order of the pitch sequence history.

14. A game apparatus according to claim 12, wherein the size of the batting mark image becomes larger as the subsequent batting position to be designated is moved closer to a previous batting position in a lower pitch order of the pitch sequence history.

15. A game apparatus according to claim 12, wherein the pitch sequence history generating section includes a pitch sequence history storage for storing a plurality of predetermined pitch sequence histories, and selects one of the plurality of predetermined pitch sequence histories before the game is started.

16. A game apparatus according to claim 15, wherein the plurality of predetermined pitch sequence histories include a pitch sequence history having at least up to a second strike.

17. A game apparatus according to claim 15, wherein the plurality of predetermined pitch sequence histories include pitch sequence histories advantageous to the pitcher side and those disadvantageous to the pitcher side.

18. A game apparatus according to claim 17, further comprising a pitcher evaluation value calculating section for calculating a pitcher evaluation value for the pitcher character, the pitcher evaluation value being changeable according to a game status, wherein the pitch sequence history generating section selects a predetermined pitch sequence history more advantageous to the pitcher side as the current pitcher evaluation value of the pitcher character increases.

19. A game apparatus according to claim 12, wherein:
the pitching position designation area is divided into a plurality of square sections; and
the image display controlling section displays square sections advantageous to the pitcher side and those disadvantageous to the pitcher side in different modes.

20. A game apparatus according to claim 12, wherein:
the batting position designation area is divided into a plurality of square sections; and
the image display controlling section displays square sections advantageous to the batter side and those disadvantageous to the batter side in different modes.

21. A game apparatus according to claim 12, wherein the image display controlling section displays the pitching position designation area and the batting position designation in a superimposed manner.

22. A game apparatus according to claim 1, wherein when the first game player controls the pitcher character, for a given pitch the pitching position designating section displays the pitching mark image but the display device does not display the batting mark image of the opponent player before the given pitch is made.

23. A game apparatus according to claim 1, wherein when the first game player controls the batter character, for a given pitch the batter position designating section displays the batting mark image but the display device does not display the pitching mark image of the opponent player before said given pitch occurs.

24. A non-transitory computer readable recording medium which stores a game control program for controlling a game apparatus operated by a first game player communicably connected with another game apparatus of same construction operable by an opponent game player, wherein each of the game apparatuses includes a display device for displaying a game simulating a baseball game, the game control program causing a computer to function as:
an image display controlling section that displays a pitching position designation area, a batting position designation area, a pitcher character and a batter character simulating, respectively, a pitcher and a batter battling with each other on the display device, a pitching motion of the pitcher character, and a batting motion of the batter character;
a pitch sequence history generating section for generating a pitch sequence history including previous pitching positions having been made in a specified at-bat before a next pitch occurs in the specified at-bat;
a pitching mark image size setting section for determining a size of a pitching mark image as an indicator of hitting difficulty based on a positional relationship between a subsequent pitching position and previous pitching positions of the pitch sequence history, wherein a smaller size of the pitching mark image indicates greater difficulty in hitting a pitch, and wherein the pitching mark image is displayed on the display device designating the subsequent pitching position in the case of the pitcher character being manipulated by the first game player;
a batting mark image size setting section for determining a size of a batting mark image as an indicator of hitting difficulty based on a positional relationship between a subsequent batting position and the previous pitching positions records of the pitch sequence history, wherein a larger size of the batting mark image indicates less difficulty in hitting a pitch, and wherein the batting mark image is displayed on the display device designating the subsequent batting position in the case of the batter character being manipulated by the first game player;
a pitching position designating section for allowing the first game player to designate the subsequent pitching position at a desired position in the pitching position designation area while moving the displayed pitching mark image whose size changes in accordance with the positional relationship to the previous pitching position, in the case of the pitcher character being manipulated by the first game player;
a batting position designating section for allowing the first game player to designate the subsequent batting position at a desired position in the batting position designation area while moving the displayed batting mark image whose size changes in accordance with the positional relationship to the previous pitching position, in the case of the batter character being manipulated by the first game player; and a battle result determining section for obtaining a result of the battle according to a determined overlapping degree of the pitching mark image designating the subsequent pitching position and the batting mark image designating the subsequent batting position.

25. A game control method for controlling a game apparatus by a first game player communicably connected with another game apparatus of same construction operable by an opponent game player, wherein each of the game apparatuses includes a display device for displaying a game simulating a baseball game, the game control method comprising the steps of:

displaying a pitching position designation area, a batting position designation area, a pitch character and a batter character simulating, respectively, a pitcher and a batter battling with each other on the display device, a pitching motion of the pitcher character, and a batting motion of the batter character;

generating a pitch sequence history including previous pitching positions having been made in a specified at-bat before a next pitch starts in the specified at-bat;

determining a size of a pitching mark image as an indicator of hitting difficulty based on a positional relationship between a subsequent pitching position and the previous pitching positions of the pitch sequence history, wherein a smaller size of the pitching mark image indicates a larger hitting difficulty;

determining a size of a batting mark image as an indicator of the hitting easiness based on a positional relationship between a subsequent batting position to be designated via the another game apparatus and the previous pitching positions of the pitch sequence, wherein a larger size of the batting mark image indicates less hitting difficulty;

displaying the pitching mark image on the display device for designating the subsequent pitching position in the case of the pitcher character being manipulated by the first game player, and displaying the batting mark image on the display device designating the subsequent batting position in the case of the batter character being manipulated by the first game player;

allowing the first game player to designate the subsequent pitching position at a desired position in the pitching position designation area while moving the displayed pitching mark image whose size changes in accordance with the positional relationship to the previous pitching position, in the case of the pitcher character being manipulated by the first game player, and allowing the first game player to designate the subsequent batting position at a desired position in the batting position designation area while moving the displayed batting mark image whose size changes in accordance with the positional relationship to the previous pitching position, in the case of the batter character being manipulated by the first game player; and obtaining a result of the battle according to a determined overlapping degree of the pitching mark image designating the subsequent pitching position and the batting mark image designating the subsequent batting position.

* * * * *